(12) United States Patent
Masuda

(10) Patent No.: US 9,024,242 B2
(45) Date of Patent: May 5, 2015

(54) SOLID-STATE IMAGE PICKUP DEVICE, IMAGE PICKUP APPARATUS, AND DRIVING METHOD

(75) Inventor: Satoshi Masuda, Neyagawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 361 days.

(21) Appl. No.: 13/697,785

(22) PCT Filed: Apr. 15, 2011

(86) PCT No.: PCT/JP2011/002234
§ 371 (c)(1),
(2), (4) Date: Nov. 13, 2012

(87) PCT Pub. No.: WO2011/142082
PCT Pub. Date: Nov. 17, 2011

(65) Prior Publication Data
US 2013/0062505 A1    Mar. 14, 2013

(30) Foreign Application Priority Data

May 13, 2010    (JP) .................................. 2010-111104

(51) Int. Cl.
*H01L 27/00* (2006.01)
*H04N 5/372* (2011.01)
*H04N 5/374* (2011.01)
*H04N 5/3745* (2011.01)
*H04N 5/378* (2011.01)

(52) U.S. Cl.
CPC ......... *H04N 5/37206* (2013.01); *H04N 5/3743* (2013.01); *H04N 5/37457* (2013.01); *H04N 5/378* (2013.01)

(58) Field of Classification Search
USPC ................. 250/208.1, 214.1, 214 R, 214 DC, 250/559.05, 559.06; 348/272, 283, 296, 348/302, 303, 304, 317; 257/431
See application file for complete search history.

(56) References Cited

U.S. PATENT DOCUMENTS

| 7,126,635 | B1 * | 10/2006 | Oochi ........................... 348/296 |
| 7,782,381 | B2 * | 8/2010 | Bloom et al. ................. 348/294 |
| 2003/0006364 | A1 | 1/2003 | Katzir et al. |
| 2006/0006311 | A1 | 1/2006 | Katzir et al. |
| 2007/0012865 | A1 | 1/2007 | Katzir et al. |
| 2008/0079830 | A1 | 4/2008 | Lepage |
| 2008/0278775 | A1 | 11/2008 | Katzir et al. |

(Continued)

FOREIGN PATENT DOCUMENTS

| DE | 10 2008 003997 | 8/2008 |
| JP | 8-18867 | 1/1996 |

(Continued)

*Primary Examiner* — Francis M Legasse, Jr.
(74) *Attorney, Agent, or Firm* — Cozen O'Connor

(57) ABSTRACT

A solid-state image pickup device which is configured not to require transfer of signal charges between pixels performs TDI. An output control section 5 sequentially assigns a pixel signal output processing period to each pixel array group 10 in the order of the vertical direction at an interval of one horizontal processing period H obtained by dividing one frame period T into three. The one frame period T is a period when each pixel array 100 is moved in the vertical direction. An adder 50 sums up a pixel signal held in a signal holding portion 41_X, and a pixel signals held in a signal holding portion 41_R, 41_G, 41_B corresponding to the pixel signal under the control of the output control section 5, and outputs the summation result to an A/D converter 60.

17 Claims, 17 Drawing Sheets

(56) References Cited

U.S. PATENT DOCUMENTS

| | | |
|---|---|---|
| 2009/0268065 A1 | 10/2009 | Fereyre |
| 2011/0114823 A1 | 5/2011 | Katzir et al. |
| 2011/0242383 A1* | 10/2011 | Yamazaki et al. ............ 348/302 |
| 2012/0206634 A1 | 8/2012 | Katzir et al. |

FOREIGN PATENT DOCUMENTS

| | | |
|---|---|---|
| JP | 11-18014 | 1/1999 |
| JP | 11-103369 | 4/1999 |
| JP | 2003-511920 | 3/2003 |
| JP | 2005-520123 | 7/2005 |
| JP | 2009-302934 | 12/2009 |
| JP | 2010-504009 | 2/2010 |
| JP | 2010-093331 | 4/2010 |
| JP | 2010-539733 | 12/2010 |
| WO | WO 01/26382 | 4/2001 |
| WO | WO 03/001189 | 1/2003 |
| WO | WO 2008/034794 | 3/2008 |

* cited by examiner

SOLID-STATE IMAGE PICKUP DEVICE, IMAGE PICKUP APPARATUS, AND DRIVING METHOD

RELATED APPLICATIONS

This is a U.S. National Phase Application under 35 USC 371 of International Application PCT/JP2011/002234 filed on Apr. 15, 2011.

This application claims the priority of Japanese application no. 2010-111104 filed May 13, 2010, the entire content of which is hereby incorporated by reference.

TECHNICAL FIELD

The present invention relates to a driving technology for a solid-state image pickup device.

BACKGROUND ART

As a solid-state image pickup device loaded in an image pickup apparatus such as a copying machine, and having pixel arrays, each of which is composed of an array of pixels, there have been known a CCD solid-state image pickup device and a CMOS solid-state image pickup device.

A CMOS solid-state image pickup device is manufactured on the basis of a CMOS LSI manufacturing process. Accordingly, the CMOS solid-state image pickup device has superior features, as compared with a CCD solid-state image pickup device, specifically, the feature i) it is possible to design a system-on-chip capable of e.g. performing an image processing function, and the feature ii) it is easy to perform high-speed processing. Thus, in recent years, the CMOS solid-state image pickup device has been widely spread.

In recent years, there is a demand for reducing the pixel size in a solid-state image pickup device, as the demands for high-resolution, miniaturization, and low-cost production have increased. In the case where the pixel size is simply reduced, the size of a photoelectric conversion section decreases and the incident light amount decreases, which may lower the sensitivity and degrade the S/N ratio.

As a technology capable of compensating for sensitivity lowering resulting from a reduction in the pixel size, there has been proposed a solid-state image pickup device employing TDI (Time Delay Integration).

For instance, patent literature 1 discloses a technology, wherein TDI is performed with use of a CCD solid-state image pickup device configured in such a manner that pixel arrays and transfer electrodes are alternately arranged in a moving direction (sub-scanning direction). Specifically, a signal charge generated in the first pixel (1, 1) at the first pixel array is transferred to the first pixel (1, 2) at the second pixel array by the first transfer electrode array. Then, the signal charge is transferred to the pixel (1, 3) after summation of the signal charges of the pixel (1, 1) and the pixel (1, 2). Then, the signal charge is transferred to the pixel (1, 4) after summation of the signal charges of the pixel (1, 1) and the pixel (1, 3). Thus, the signal charge generated in the pixel (1, 1) is sequentially transferred while undergoing integration with the signal charges of the pixel (1, 4), the pixel (1, 5), . . . , and the pixel (1, n).

In this configuration, the transfer rate of signal charges between pixel arrays is synchronized with the moving speed of pixel arrays. Accordingly, it is possible to expose each of the pixel arrays at the same subject position. Thus, "n" pixel arrays are sequentially exposed at the same subject position, and signal charges of "n" pixel arrays are integrated, whereby TDI is performed.

Specifically, a photoelectric conversion section of each of the pixels is emptied by completely transferring a signal charge accumulated during an exposure period to a pixel in a next pixel array for time delay integration. Thus, the image pickup device is brought to an exposure start state for a next frame.

As described above, the CCD solid-state image pickup device can easily perform TDI because the CCD solid-state image pickup device can transfer signal charges between pixels.

However, since a CMOS solid-state image pickup element is designed to be driven at a low voltage on the basis of a CMOS LSI manufacturing process, it is difficult to transfer signal charges between pixels.

CITATION LIST

Patent Literature

Patent Literature 1: JP Hei 8-18867A

SUMMARY OF INVENTION

An object of the invention is to provide an arrangement of performing TDI in a solid-state image pickup device which is configured not to require transfer of signal charges between pixels.

A solid-state image pickup device according to an aspect of the invention is a solid-state image pickup device includes a pixel unit which is movable relative to a subject in a vertical direction at a predetermined moving speed. The pixel unit includes M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction; readout sections which are provided in correspondence to columns of the pixel unit arranged in the horizontal direction, each of the readout sections being provided in common for each of the columns to read out pixel signals outputted from each pixel array; and an output control section which selects each one of the pixel array groups in a predetermined order, selects each one of the pixel arrays in the selected pixel array group in a predetermined order, causes the readout sections to read out, as pixel signals of a current frame, pixel signals of one frame obtained by exposing the last pixel array in the selected pixel array group, and causes the readout sections to read out, as pixel signals of a previous frame, pixel signals of one frame obtained by exposing the pixel arrays in the forward of the last pixel array with respect to the moving direction of the pixel unit in the selected pixel array group. Each of the readout sections includes: a signal holding portion which holds a pixel signal of the previous frame; and an adder which sums up the pixel signal of the current frame, and the pixel signal of the previous frame which is in the same pixel array group and is for the same subject position as the current frame among the respective pixel signals of the previous frames held in the signal holding portion.

An image pickup apparatus according to another aspect of the invention includes the solid-state image pickup device, and a control section which controls the solid-state image pickup device.

A driving method according to yet another aspect of the invention is a driving method for a solid-state image pickup device provided with a pixel unit which is movable relative to a subject in a vertical direction at a predetermined moving speed, the pixel unit including M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction, readout sections which are provided in correspondence to columns of the pixel unit arranged in the horizontal direction, each of the readout sections being provided in common for each of the columns to read out pixel signals from each pixel array, and an output control section which selects each one of the pixel array groups in a predetermined order, selects each one of the pixel arrays in the selected pixel array group in a predetermined order, causes the readout sections to read out, as pixel signals of a current frame, pixel signals to be outputted from the last pixel array in the selected pixel array group, and causes the readout sections to read out, as pixel signals of a previous frame, pixel signals in the pixel arrays in the forward of the last pixel array with respect to the moving direction of the pixel unit in the selected pixel array group, each of the readout sections including a signal holding portion and an adder. The method includes a step of holding a pixel signal of the previous frame in the signal holding portion; and a step of summing up, by the adder, the pixel signal of the current frame, and the pixel signal of the previous frame which is in the same pixel array group and is for the same subject position as the current frame among the respective pixel signals of the previous frames held in the signal holding portion.

BRIEF DESCRIPTION OF DRAWINGS

FIG. 6 is a circuit diagram of a signal holding portion;

DESCRIPTION OF EMBODIMENTS

Figure 1:
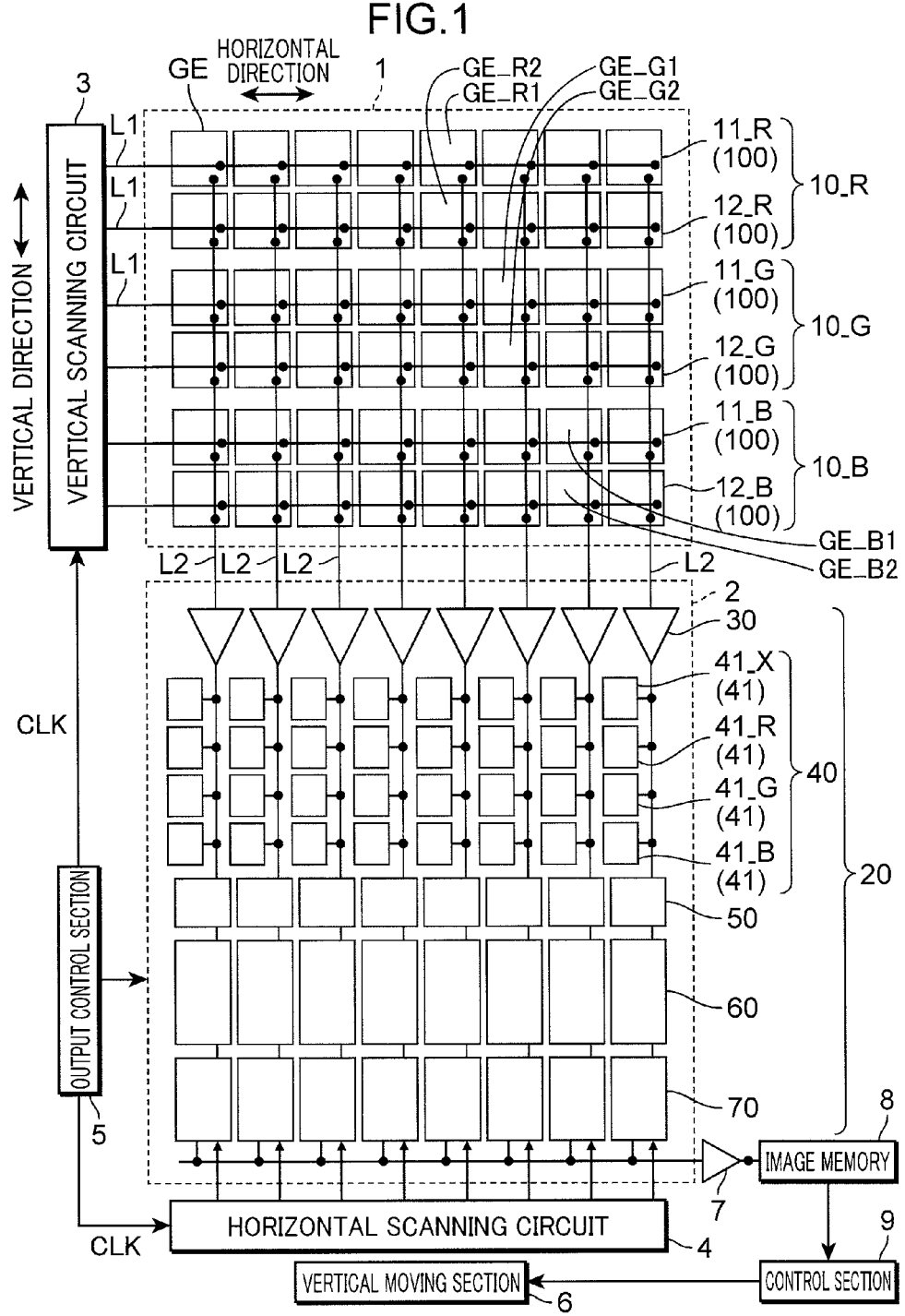
FIG. 1 is an overall configuration diagram of an image pickup device embodying the invention.

In the following, an image pickup device embodying the invention is described referring to the accompanying drawings. FIG. 1 is an overall configuration diagram of the image pickup device in the embodiment. As shown in FIG. 1, the image pickup device is provided with a pixel unit 1, a readout unit 2, a vertical scanning circuit 3, a horizontal scanning circuit 4, an output control section 5, a vertical moving section 6, a buffer 7, an image memory 8, and a control section 9.

Referring to FIG. 1, a configuration except for the vertical moving section 6, the buffer 7, the image memory 8, and the control section 9, in other words, the pixel unit 1, the readout unit 2, the vertical scanning circuit 3, the horizontal scanning circuit 4, and the output control section 5 constitute a solid-state image pickup device.

The pixel unit 1 is movable relative to a subject in a vertical direction at a predetermined moving speed under the control of the vertical moving section 6. In this embodiment, the pixel unit 1 exposes a subject in a stationary state by moving in a vertical direction. This is merely an example. Alternatively, a subject may be moved in a vertical direction, and the subject is exposed by the pixel unit 1 in a stationary state.

The pixel unit 1 is provided with three pixel array groups 10_R, 10_G, and 10_B, which are arranged in a vertical direction orthogonal to a horizontal direction. In the case where the pixel array groups 10_R through 10_B are not discriminated from each other, the pixel array groups are described as pixel array groups 10. The pixel array groups 10_R, 10_G, and 10_B are respectively provided with pixel arrays 11_R and 12_R; pixel arrays 11_G and 12_G; and pixel arrays 11_B and 12_B. Thus, each of the pixel array groups is constituted of two pixel arrays in a vertical direction. In other words, in this embodiment, the pixel unit 1 is constituted of six pixel arrays 11_R through 12_B. In this example, in the case where the pixel arrays 11_R through 12_B are not discriminated from each other, the pixel arrays are described as pixel arrays 100. Each of the pixel arrays 100 is configured in such a manner that a number of pixels GE are aligned in a horizontal direction.

The pixel array groups 10_R, 10_G, and 10_B respectively correspond to red (R), green (G), and blue (B). Specifically, the pixel arrays 11_R and 12_R are respectively constituted of R pixels GE_R1 and R pixels GE_R2; the pixel arrays 11_G and 12_G are respectively constituted of G pixels GE_G1 and G pixels GE_G2; and the pixel arrays 11_B and 12_B are respectively constituted of B pixels GE_B1 and B pixels GE_B2.

In other words, in this embodiment, by composing each of the pixel array groups 10 of two pixel arrays 100, it is possible to perform TDI (Time Delay Integration) for two pixel arrays with respect to each of R, G, and B. R, G, and B color filters are provided for R, G, and B pixels GE, respectively. R, G, and B light are received by receiving light through these color filters.

In FIG. 1, three pixel array pairs are provided as the pixel array groups 10. This is merely an example. Alternatively, M (where M is an integer of one or larger) pixel array(s) may be provided as the pixel array groups. Further, in FIG. 1, two pixel arrays are provided as one pixel array group 10. This is merely an example. Alternatively, N (where N is an integer of two or larger) pixel arrays may be provided as one pixel array group.

Figure 2:
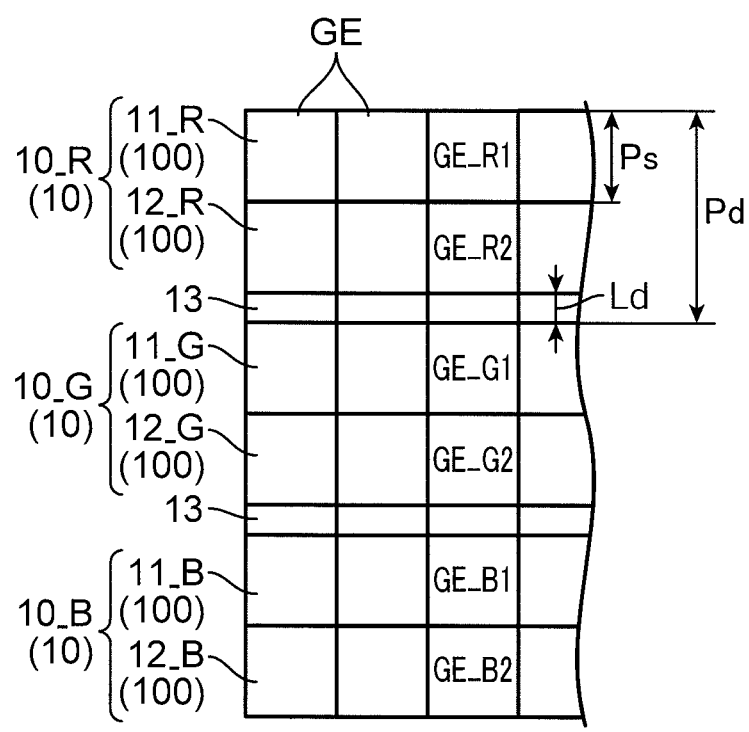
FIG. 2 is a diagram showing a detailed configuration of a pixel unit shown in FIG. 1.

FIG. 2 is a diagram showing a detailed configuration of the pixel unit 1 shown in FIG. 1. As shown in FIG. 2, the pixel arrays 100 are arranged to be adjacent to each other in a vertical direction via an interval region 13. The interval region 13 has a strip-like shape, with a length Ld in a vertical direction, and a length in a horizontal direction which is equal to the length of each pixel array 100 in the horizontal direction. In other words, the pixel array 12_R and the pixel array 11_G are disposed away from each other with an interval of Ld in a vertical direction, and the pixel array 12_G and the pixel array 11_B are disposed away from each other with an interval of Ld in a vertical direction.

Regarding one pixel array group 10, the arrangement interval between the pixel arrays 100 is set to Ps in a vertical direction. Further, the arrangement interval between the three pixel array groups 10_R, 10_B, and 10_B is set to Pd in a vertical direction.

Figure 3:
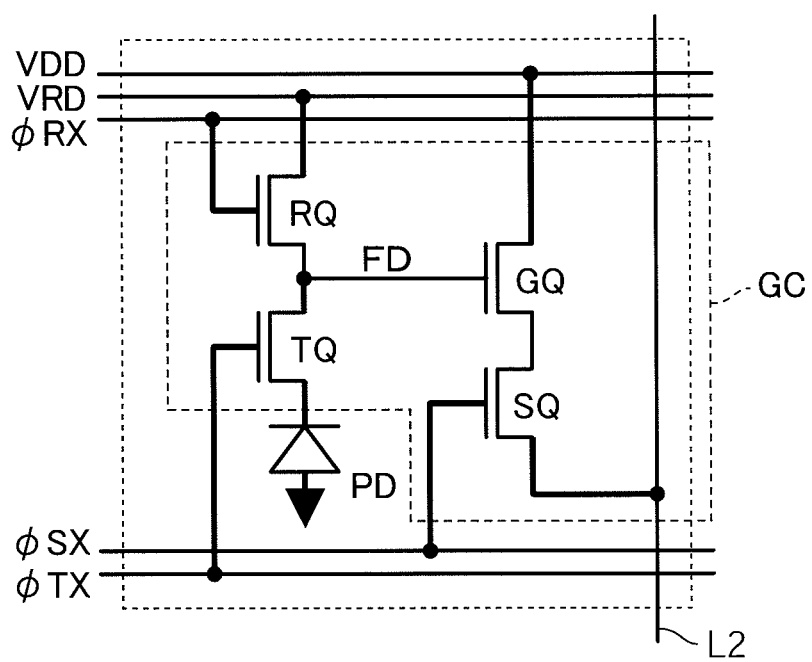
FIG. 3 is a circuit diagram of a photoelectric conversion section and a pixel circuit constituting one pixel GE.

FIG. 3 is a circuit diagram of a photoelectric conversion section PD and a pixel circuit GC constituting one pixel GE. The pixel circuit GC is constituted of a CMOS pixel circuit, and includes a transfer transistor TQ, a reset transistor RQ, an amplification transistor GQ, and a row selection transistor SQ.

The photoelectric conversion section PD receives light from a subject, and accumulates a signal charge in accordance with a received light amount. In this example, an anode of the photoelectric conversion section PD is grounded, and a cathode thereof is connected to one end of the transfer transistor TQ.

The transfer transistor TQ is turned on and off by a signal φTX to be inputted to a gate thereof. In the case where the transfer transistor TQ is turned on, the transfer transistor TQ transfers a signal charge accumulated in the photoelectric conversion section PD to a floating diffusion (hereinafter, called as "FD"). The signal φTX is outputted e.g. from the vertical scanning circuit 3 via a corresponding row selection signal line L1.

The FD accumulates a signal charge transferred from the photoelectric conversion section PD, converts into a voltage signal of a level in accordance with the magnitude of the accumulated signal charge, and outputs the voltage signal as a pixel signal.

A drive voltage VRD is inputted to one end of the reset transistor RQ. The reset transistor RQ resets the FD by turning on and off in response to a signal φRX to be inputted to a gate thereof. The drive voltage VRD is outputted from an unillustrated voltage source, and the signal φRX is outputted from e.g. the vertical scanning circuit 3 via the corresponding row selection signal line L1.

A drive voltage VDD is inputted to one end of the amplification transistor GQ. The amplification transistor GQ amplifies a pixel signal to be outputted from the FD, and outputs the amplified signal to the row selection transistor SQ. The drive voltage VDD is outputted from e.g. an unillustrated voltage source.

The row selection transistor SQ is turned on and off by a row selection signal φSX to be inputted to a gate thereof. In the case where the row selection transistor SQ is turned on, the row selection transistor SQ outputs a pixel signal outputted from the amplification transistor GQ to a readout section 20 via a corresponding vertical signal line L2. The signal φSX is outputted e.g. from the vertical scanning circuit 3 via the corresponding row selection signal line L1.

Referring back to FIG. 1, the vertical scanning circuit 3 is connected to each pixel array 100 via the corresponding row selection signal line L1. The vertical scanning circuit 3 cyclically outputs a row selection signal for selecting each one of the pixel arrays 100 downwardly or upwardly in a vertical direction in accordance with a clock signal CLK to be outputted from the output control section 5, thereby scanning the pixel unit 1 in a vertical direction.

In this embodiment, the vertical scanning circuit 3 is constituted of a shift register which is operated in accordance with e.g. a clock signal CLK. Constituting the vertical scanning circuit 3 of a shift register is advantageous in cyclically selecting each one of the pixel arrays 100 with a simplified configuration.

There are provided a plurality of vertical signal lines L2 in correspondence to the number of pixels in the pixel arrays in a horizontal direction in the pixel unit 1. Further, each of the vertical signal lines L2 is connected to a corresponding column of six pixels GE in the pixel arrays.

The readout unit 2 is provided with a plurality of readout sections 20 in correspondence to the number of pixels in the pixel arrays in a horizontal direction in the pixel unit 1. Each of the readout sections 20 sequentially reads out pixel signals from the corresponding column of six pixels GE in the pixel arrays via the corresponding vertical signal line L2. The details of the readout section 20 will be described later.

Figure 4:
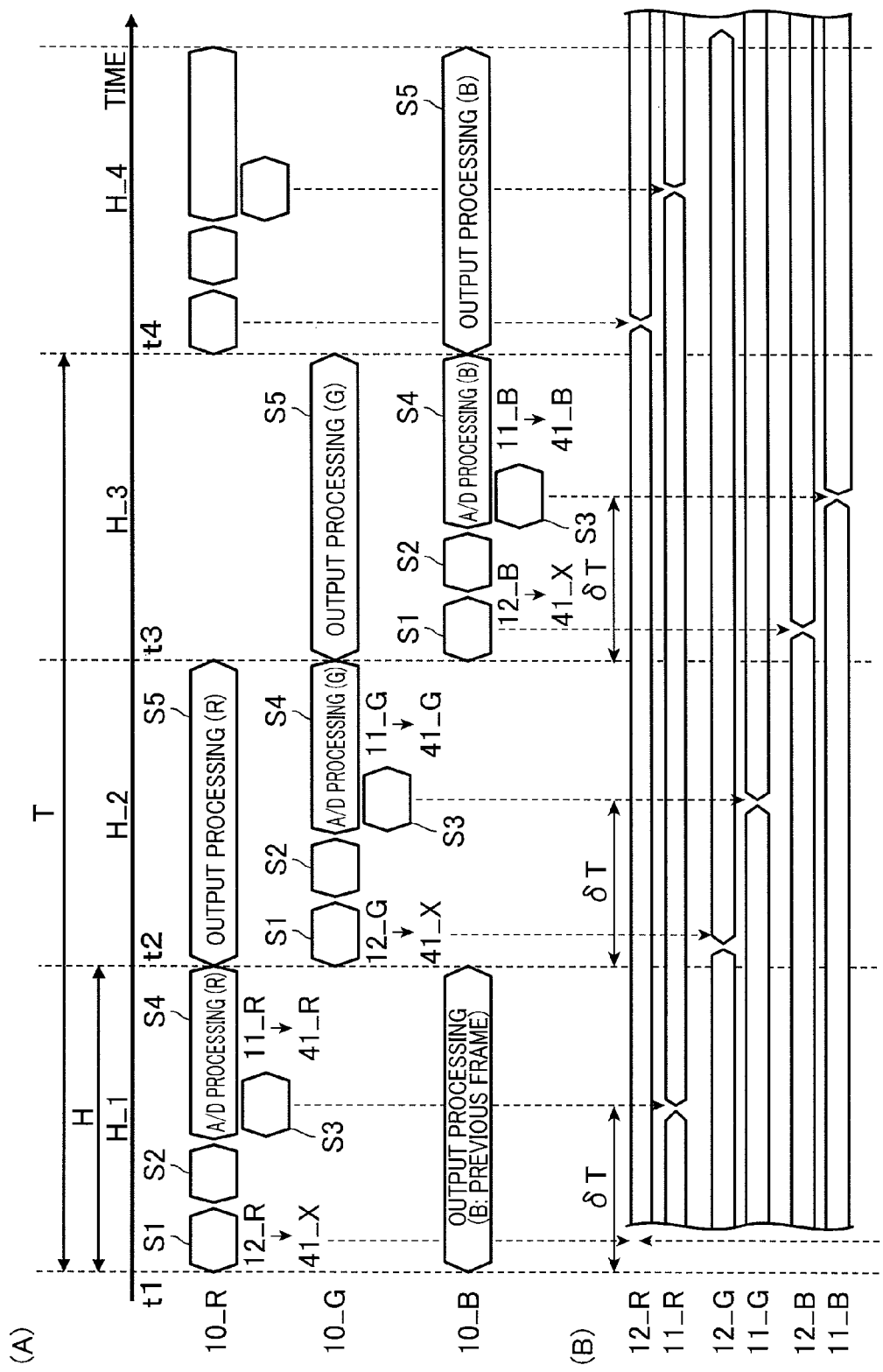
FIG. 4 at sections (A) and (B) is a timing chart showing an operation to be performed by the image pickup device in the embodiment.

As shown in FIG. 4, the output control section 5 selects each one of the pixel array groups 10 by sequentially assigning an output processing period of a pixel signal to be outputted from each of the pixel array groups 10 in the order of the vertical direction at an interval of a horizontal processing period H. The horizontal processing period H is obtained by dividing a frame period T into three. The frame period T is a period when each of the pixel arrays 100 is moved in a vertical direction by a predetermined distance. In this embodiment, the output control section 5 assigns the output processing period in the order of the pixel array groups 10_R, 10_G, and 10_B, in other words, in the order of R, G, B at an interval of the horizontal processing period H. The details of the processing to be performed by the output control section 5 will be described later.

Referring back to FIG. 1, each of the readout sections 20 is provided with an amplifier 30, a signal holding portion group 40, an adder 50, an A/D converter 60, and a latch section 70. The amplifier 30 is connected between the pixel unit 1 and the corresponding signal holding portion group 40. The amplifier 30 performs correlation double sampling with respect to a pixel signal to be outputted from each of the pixels GE, extracts only an image component by removing a noise component included in the pixel signal, amplifies the extracted image component with a predetermined gain, and outputs the amplified signal to the corresponding signal holding portion group 40.

In this embodiment, during a one-time pixel signal output operation, the pixel GE outputs a pixel signal including only a noise component at a first phase, and outputs a pixel signal including a noise component and an image component at a second phase. Accordingly, the amplifier 30 performs correlation double sampling of extracting a pixel signal including only an image component by subtracting, from the pixel signal including the noise component and the image component that has been outputted at the second phase, the pixel signal including only the noise component that has been outputted at the first phase.

The signal holding portion group 40 is provided with four signal holding portions 41_X, 41_R, 41_G, and 41_B. In the case where the signal holding portions 41_X, 41_R, 41_G, and 41_B are not discriminated from each other, the signal holding portions are described as signal holding portions 41. Each of the signal holding portions 41 is constituted of e.g. an analog memory composed of a sampling and holding circuit.

FIG. 6 is a circuit diagram of a signal holding portion 41. The signal holding portion 41 is constituted of a pair of switches SW1 and SW2, and a capacitor C1. The switches SW1 and SW2 are provided on a vertical signal line L2. The switch SW1 is provided upstream of the switch SW2 with respect to the pixel signal transmitting direction. One end of the capacitor C1 is connected to a connection point between the switches SW1 and SW2, and the other end thereof is grounded.

The switch SW1, SW2 is constituted of e.g. a transistor, and is turned on and off in response to a control signal to be outputted from the output control section 5. In the case where the switch SW is turned on and the switch SW2 is turned off, the signal holding portion 41 accumulates a pixel signal transmitted through the vertical signal line L2 into the capacitor C1. By performing the above operation, an analog pixel signal is held.

On the other hand, in the case where the switch SW is turned off and the switch SW2 is turned on, the signal holding portion 41 outputs a pixel signal accumulated in the capacitor C1 to the adder 50. Further, in the case where the switch SW1 is turned on and the switch SW2 is turned on, the signal holding portion 41 allows a pixel signal transmitted through the vertical signal line L2 to pass therethrough.

The signal holding portion 41 shown in FIG. 6 is merely an example. Alternatively, any circuit configuration may be employed, as far as the circuit is operable to hold an analog pixel signal.

Referring back to FIG. 1, the signal holding portion 41_X sequentially holds a pixel signal of a current frame, which is outputted from the pixel array 12_R, 12_G, 12_B. In this example, pixel signals of a current frame indicate pixel signals corresponding to one frame, which are obtained by exposing the last pixel array i.e. the pixel array 12_R, 12_G, 12_B in the pixel array group 10 to which an output processing period is assigned.

The signal holding portion 41_R holds a pixel signal of a previous frame, which is outputted from the pixel array 11_R. The signal holding portion 41_G holds a pixel signal of a previous frame, which is outputted from the pixel array 11_G. The signal holding portion 41_B holds a pixel signal of a previous frame, which is outputted from the pixel array 11_B. This is merely an example. Alternatively, each of the signal holding portions 41 may hold a pixel signal to be outputted from pixel arrays different from each other. In this example, pixel signals of a previous frame indicates pixel signals corresponding to one frame, which are obtained by exposing the pixel array 11_R, 11_G, 11_B in the forward of the last pixel array i.e. the pixel array 12_R, 12_G, 12_B with respect to the moving direction of the pixel unit 1 in the pixel array group 10 to which an output processing period is assigned.

The adder 50 is constituted of e.g. an analog adder circuit. The adder 50 sums up a pixel signal held in the signal holding portion 41_X, and a pixel signal which is in the same position as the aforementioned pixel signal and which is held in the signal holding portion 41_R, 41_G, 41_B; and outputs the summation result to the A/D converter 60.

The A/D converter 60 is constituted of e.g. an integration A/D converter or a successive approximation A/D converter. The A/D converter 60 converts a pixel signal outputted from the adder 50 into a digital pixel signal of a predetermined bit number (e.g. 14 bits). In the following, a digital pixel signal is described as pixel data.

The latch section 70 holds the pixel data outputted from the A/D converter 60. In response to designation of a certain latch section 70 by the horizontal scanning circuit 4, the designated latch section 70 outputs the pixel data held therein to the image memory 8 via the buffer 7.

The horizontal scanning circuit 4 is constituted of e.g. a shift register. The horizontal scanning circuit 4 cyclically outputs, to each of the readout section 20, a column selection signal for sequentially selecting the pixels in the pixel arrays in a horizontal direction in the pixel unit 1 rightwardly in accordance with a clock signal CLK to be outputted from the output control section 5; and causes the latch section 70 in the selected readout section 20 to output the pixel data. Alternatively, the horizontal scanning circuit 4 may sequentially select each one of the readout sections 20 leftwardly.

In the case where the voltage of pixel data to be outputted from the latch section 70 is equal to or higher than a predetermined threshold value, the buffer 7 increases the level of the voltage to a predetermined level; and in the case where the voltage of pixel data is lower than the predetermined threshold value, the buffer 7 sets the voltage level to zero. By performing the above operation, it is possible to clearly set the bit value of each bit constituting one pixel data to Hi or Lo.

The image memory 8 is constituted of e.g. an RAM having a storage capacity capable of storing pixel data corresponding to plural frames.

The control section 9 is constituted of a computer provided with e.g. a CPU, an ROM, an RAM; and controls overall operations of the image pickup device. The vertical moving section 6 is constituted of a moving mechanism for moving the pixel unit 1 in a vertical direction by a predetermined distance, and a motor for giving a driving force to the moving mechanism. With this arrangement, the pixel unit 1 is movable relative to a subject for exposing the subject. In the case where a configuration of moving a subject relative to the pixel unit 1 in a stationary state is employed, a moving mechanism for moving a subject in a vertical direction may be used as the moving mechanism for the vertical moving section 6. In the modification, the subject may be e.g. a document, and the moving mechanism may be e.g. a transport roller for transporting a document while holding the document.

Figure 5:
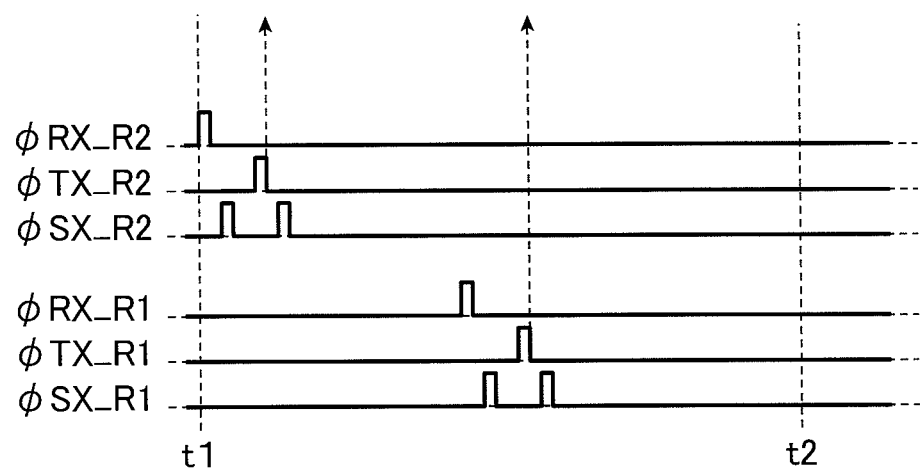
FIG. 5 is a timing chart of the pixel circuit shown in FIG. 3.

Next, the details of a processing to be performed by the output control section 5 are described. FIG. 4 at sections (A) and (B) is a timing chart showing an operation to be performed by the image pickup device in this embodiment. FIG. 5 is a timing chart of the pixel circuit GC shown in FIG. 3.

Referring to the section (A) of FIG. 4, the first through third rows respectively indicate the processings to be performed with respect to the pixel array groups 10_R, 10_G, and 10_B. Further, in the section (A) of FIG. 4, horizontal processing periods H_0, H_(−1), H_(−2) . . . follow on the left side of the horizontal processing period H_1; and horizontal processing periods H_5, H_6, H_7 . . . follow on the right side of the horizontal processing period.

Referring to the section (B) of FIG. 4, the first through sixth rows respectively indicate the exposure periods of the pixel arrays 12_R, 11_R, 12_G, 11_G, 12_B, and 11_B.

The output control section 5 executes first through fifth processings S1 through S5 at an interval of a horizontal processing period H. The first processing S1 is a processing of, in the case where an output processing period is assigned to a certain pixel array group 10 as a target pixel array group 10_X among the pixel array groups 10_R, 10_G, and 10_B, outputting a pixel signal from the second pixel array i.e. the pixel array 12_R, 12_G, 12_B as the last pixel array with respect to the moving direction of the pixel unit 1 in the target pixel array group 10_X; and holding the outputted pixel signal in the signal holding portion 41_X.

In the example shown in FIG. 4, the output processing periods of the pixel array groups 10_R, 10_G, 10_B, and 10_R are respectively assigned to the horizontal processing periods H_1, H_2, H_3, and H_4. Accordingly, the pixel array group 10_R serves as a target pixel array group 10_X during the horizontal processing periods H_1 and H_4; the pixel array group 10_G serves as a target pixel array group 10_X during the horizontal processing period H_2; and the pixel array group 10_B serves as a target pixel array group 10_X during the horizontal processing period H_3.

In the first processing S1 during the horizontal processing period H_1, a pixel signal of a current frame is outputted from the pixel array 12_R and held in the signal holding portion 41_X. As shown in the section (B) of FIG. 4, pixel signals of the current frame are pixel signals obtained by exposing the pixel array 12_R during one frame period T corresponding to the horizontal processing periods H_(−2) through H_0.

FIG. 5 shows the details of the processing of outputting a pixel signal of a current frame. As shown in FIG. 5, at a timing t1 as a start timing of the horizontal processing period H_1, a signal φRX_R2 is inputted to the reset transistor RQ of the pixel GE_R2 in the pixel array 12_R. Then, the reset transistor RQ is turned on for a predetermined time, and the FD is reset.

Then, a signal φSX_R2 is inputted to the row selection transistor SQ of the pixel GE_R2. Then, the row selection transistor SQ is turned on for a predetermined time, and a voltage of the reset level of the FD is outputted to the readout section 20 via the vertical signal line L2. The voltage of the reset level represents a pixel signal corresponding to a noise component of the pixel GE_R2.

Then, a signal φTX_R2 is inputted to the transfer transistor TQ of the pixel GE_R2. Then, the transfer transistor TQ is turned on for a predetermined time, and a signal charge accumulated in the photoelectric conversion section PD for a frame period T is transferred to the FD. In response to turning off of the transfer transistor TQ, the photoelectric conversion section PD starts light exposure for a next frame.

Then, the signal φTX_R2 is inputted to the row selection transistor SQ of the pixel GE_R2. The row selection transistor SQ is turned on for a predetermined time, and the voltage of the FD is outputted to the readout section 20 as a pixel signal via the vertical signal line L2. The pixel signal includes a noise component and an image component.

Then, the amplifier 30 of the readout section 20 subtracts a pixel signal including only a noise component, from the pixel signal including the noise component and the image component. Then, the pixel signal including only the image component is held in the signal holding portion 41_X.

The processing described as above referring to FIG. 5 is sequentially executed for the pixel arrays 12_G, 12_B, and 12_R at an interval of a start timing t2, t3, t4 of the horizontal processing period H_2, H_3, H_4. By performing the above operation, a pixel signal during a frame period T is outputted from each of the pixel arrays 100 at an interval of the horizontal processing period H, and held in the signal holding portion 41_X.

Referring back to the section (A) of FIG. 4, in the first processing S1 during the horizontal processing period H_2, a pixel signal of a current frame is outputted from the pixel array 12_G, and held in the signal holding portion 41_X. As shown in the section (B) of FIG. 4, pixel signals of the current frame are pixel signals obtained by exposing, to light from a subject, the pixel array 12_G during a frame period T corresponding to the horizontal processing periods H_(−1) through H_1.

In the first processing S1 during the horizontal processing period H_3, a pixel signal of a current frame is outputted from the pixel array 12_B, and held in the signal holding portion 41_X. As shown in the section (B) of FIG. 4, pixel signals of the current frame are pixel signals obtained by exposing, to light from a subject, the pixel array 12_B during a frame period T corresponding to the horizontal processing periods H_0 through H_2.

As described above, a pixel signal of a current frame is sequentially outputted from the pixel arrays 12_R, 12_G, and 12_B at an interval of the horizontal processing period H, and held in the signal holding portion 41_X.

The second processing S2 is a processing of causing the adder 50 to sum up a pixel signal of a current frame held in the signal holding portion 41_X, and a pixel signal of a previous frame in the same position as the current frame, which is outputted from the first pixel array 100 and held in the signal holding portion 41, in the case where an output processing period is assigned to a target pixel array group 10_X in the past.

In the example of the section (A) of FIG. 4, in the second processing S2 during the horizontal processing period H_1, a pixel signal V_R2 of a current frame that has been held in the signal holding portion 41_X, and a pixel signal V_R1 of a previous frame that has been held in the signal holding portion 41_R are summed up. By performing the summation, the signal holding portions 41_X and 41_R are emptied. In this example, the pixel signal V_R1 held in the signal holding portion 41_X is a pixel signal outputted from the pixel array 12_R in the first processing S1 during the horizontal processing period H_1. Further, the pixel signal held in the signal holding portion 41_R is a pixel signal V_R1 outputted from the pixel array 11_R in the third processing S3 during the horizontal processing period H_(−2), which is a period preceding the horizontal processing period H_1 by one frame period T.

Figure 7:
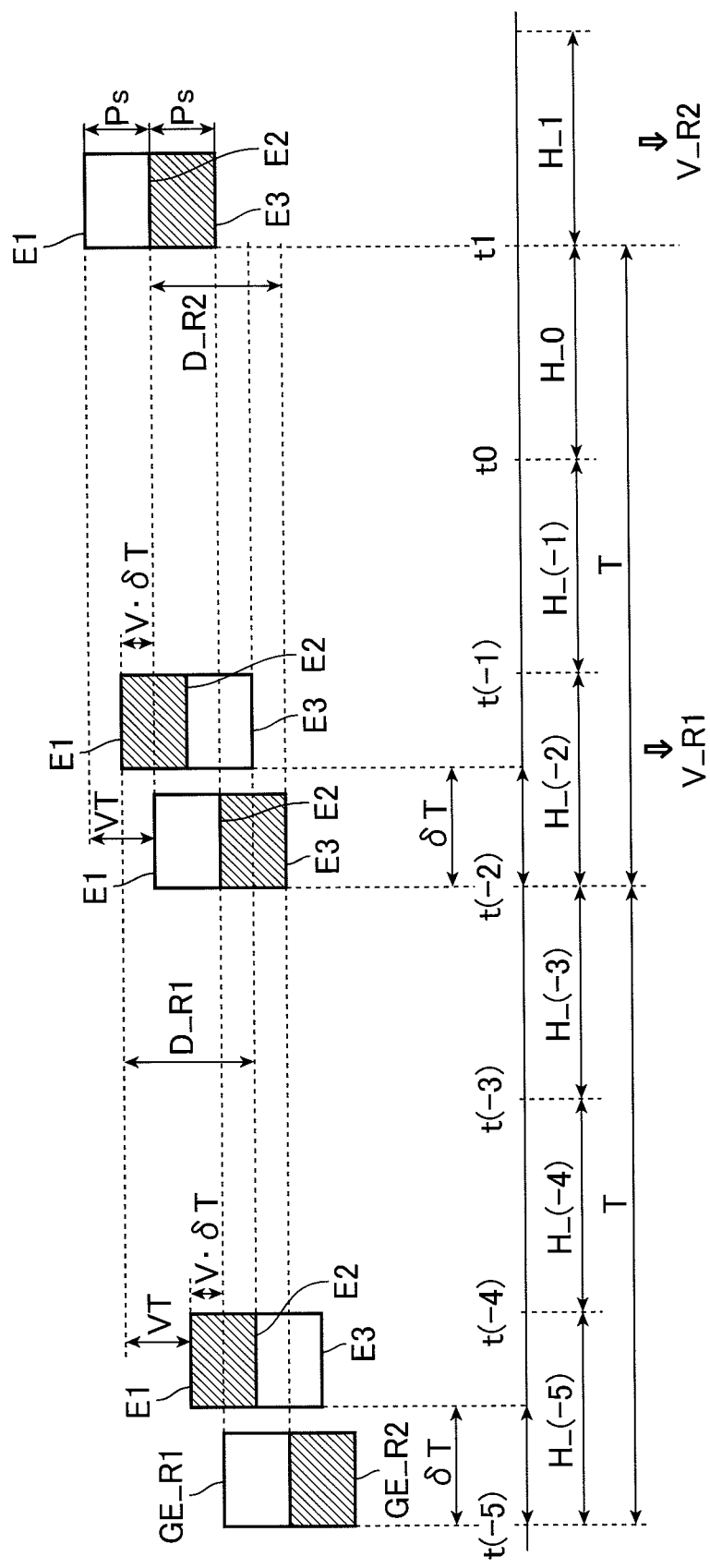
FIG. 7 is a diagram for explaining an exposure period of each pixel array.

FIG. 7 is a diagram for explaining an exposure period of the pixel GE_R1 in the pixel array 11_R and the pixel GE_R2 in the pixel array 12_R. In FIG. 7, the moving speed of the pixel unit 1 is set to V.

The pixel signal V_R1 is a pixel signal obtained by exposing, to light from a subject, the pixel GE_R1 for a frame period T from the timing t(−5)+δT to the timing t(−2)+δT. In this example, δT indicates a delay time from the start timing of a horizontal processing period H to the start timing of the third processing S3. Since the pixel GE_R1 is moved by a distance corresponding to V*T during the frame period T, the frame where the pixel GE_R1 is exposed is represented by D_R1. The exposure start position of the frame D_R1 corresponds to a rearward end (corresponding to the forward end E2 of the pixel GE_R2) of the pixel GE_R1 at the timing t(−5)+δT, and the exposure end position of the frame D_R1 corresponds to the forward end E1 of the pixel GE_R1 at the timing t(−2)+δT.

The pixel signal V_R2 is a pixel signal obtained by exposing, to light from a subject, the pixel GE_R2 during a frame period T from the timing t(−2) to the timing t1. Since the pixel GE_R2 is moved by a distance corresponding to V*T during the frame period T, the frame where the pixel GE_R2 is exposed is represented by D_R2. The exposure start position of the frame D_R2 corresponds to the rearward end E3 of the pixel GE_R2 at the timing t(−2), and the exposure end position of the frame D_R2 corresponds to the forward end E2 of the pixel GE_R2 at the timing t1.

Further, a displacement between the frame D_R1 and the frame D_R2 is V*δT, which is very small. Accordingly, it can be said that the frame D_R1 and the frame D_R2 are substantially at the same subject position as each other; and the pixel signal V_R2 is a pixel signal obtained by exposing a pixel region substantially at the same subject position as the position where the pixel signal V_R1 is obtained after lapse of a frame period T.

Accordingly, in the second processing S2, it is possible to perform TDI by summing up the pixel signal V_R1 and the pixel signal V_R2.

Referring back to the section (A) of FIG. 4, in the second processing S2 during the horizontal processing period H_2, a pixel signal V_G2 of a current frame held in the signal holding portion 41_X, and a pixel signal V_G1 of a previous frame held in the signal holding portion 41_G are summed up. By performing the summation, the signal holding portions 41_X and 41_G are emptied. The pixel signal V_G2 is a pixel signal outputted from the pixel array 12_G in the first processing S1 during the horizontal processing period H_2. Further, the pixel signal V_G1 is a pixel signal outputted from the pixel array 11_G in the third processing S3 during the horizontal processing period H_(−1) which precedes the horizontal processing period H_2 by one frame period T.

In the second processing S2 during the horizontal processing period H_3, a pixel signal V_B2 of a current frame held in the signal holding portion 41_X, and a pixel signal V_B1 of a previous frame held in the signal holding portion 41_B are summed up. By performing the summation, the signal holding portions 41_X and 41_B are emptied. The pixel signal V_B2 is a pixel signal outputted from the pixel array 12_B in the first processing S1 during the horizontal processing period H_3. Further, the pixel signal V_B1 is a pixel signal outputted from the pixel array 11_B in the third processing S3 during the horizontal processing period H_(0) which precedes the horizontal processing period H_2 by one frame period T.

The third processing S3 is a processing of outputting a pixel signal of a previous frame from the first pixel array 11_R, 11_G, 11_B in a target pixel array group 10_X, and holding the outputted pixel signal in the signal holding portion 41.

In the example of the section (A) of FIG. 4, in the third processing S3 during the horizontal processing period H_1, a pixel signal V_R1 is outputted from the pixel array 11_R, and held in the signal holding portion 41_R. As shown in the section (B) of FIG. 4, the pixel signal V_R1 is a pixel signal obtained by exposing, to light from a subject, the pixel array 11_R during a frame period T after lapse of δT from the start timing of the horizontal processing period H_(−2) and after lapse of δT from the start timing of the horizontal processing period H_1. The details of the processing of outputting the pixel signal V_R1 are shown in FIG. 5. Since the processing of outputting the pixel signal V_R1 is the same as the processing of outputting the pixel signal V_R2, description thereof is omitted herein.

Further, in the third processing S3 during the horizontal processing period H_2, a pixel signal V_G1 is outputted from the pixel array 11_G, and held in the signal holding portion 41_G. As shown in the section (B) of FIG. 4, the pixel signal V_G1 is a pixel signal obtained by exposing, to light from a subject, the pixel array 11_G during a frame period T after lapse of δT from the start timing of the horizontal processing period H_(−1) and after lapse of δT from the start timing of the horizontal processing period H_2.

Further, in the third processing S3 during the horizontal processing period H_3, a pixel signal V_B1 is outputted from the pixel array 11_B, and held in the signal holding portion 41_B. As shown in the section (B) of FIG. 4, the pixel signal V_B1 is a pixel signal obtained by exposing, to light from a subject, the pixel array 11_B during a frame period T after lapse of δT from the start timing of the horizontal processing period H_0 and after lapse of δT from the start timing of the horizontal processing period H_3.

As described above, in the third processing S3, pixel signals are outputted from the pixel arrays 11_R, 11_G, and 11_B at a timing delayed by δT with respect to the pixel arrays 12_R, 12_G, and 12_B at an interval of the horizontal processing period H, and held in the signal holding portions 41_R, 41_G, and 41_B.

The fourth processing S4 is a processing of causing the A/D converter 60 to A/D convert a pixel signal obtained by summation by the adder 50. The fourth processing S4 is executed concurrently with the third processing S3.

In the example of the section (A) of FIG. 4, in the fourth processing S4 during the horizontal processing period H_1, the R pixel signal obtained by summation in the second processing S2 is A/D converted into pixel data, and latched by the latch section 70. When the fourth processing S4 during the horizontal processing period H_1 is ended, the latch sections 70 in all the pixel arrays latch the R pixel data corresponding to one frame.

The fourth processing S4 for G pixels and B pixels is executed during the horizontal processing periods H_2 and H_3 in the same manner as during the horizontal processing period H_1.

The fifth processing S5 is a processing of sequentially outputting pixel data corresponding to one frame that has been latched in the latch sections 70 in the fourth processing S4. The fifth processing S5 is executed concurrently with the first through fourth processings S1 through S4.

In the example of the section (A) of FIG. 4, in the fifth processing S5 during the horizontal processing period H_2, the R pixel data corresponding to one frame that has been latched in the latch sections 70 of all the pixel arrays in the fourth processing S4 during the horizontal processing period H_1 is sequentially outputted, and stored in the image memory 8.

The fifth processing S5 for G pixels and B pixels is executed during the horizontal processing periods H_3 and H_4 in the same manner as during the horizontal processing period H_2. In this way, R, G, and B image data corresponding to one frame is stored in the image memory 8 at an interval of the horizontal processing period H.

Figure 8:
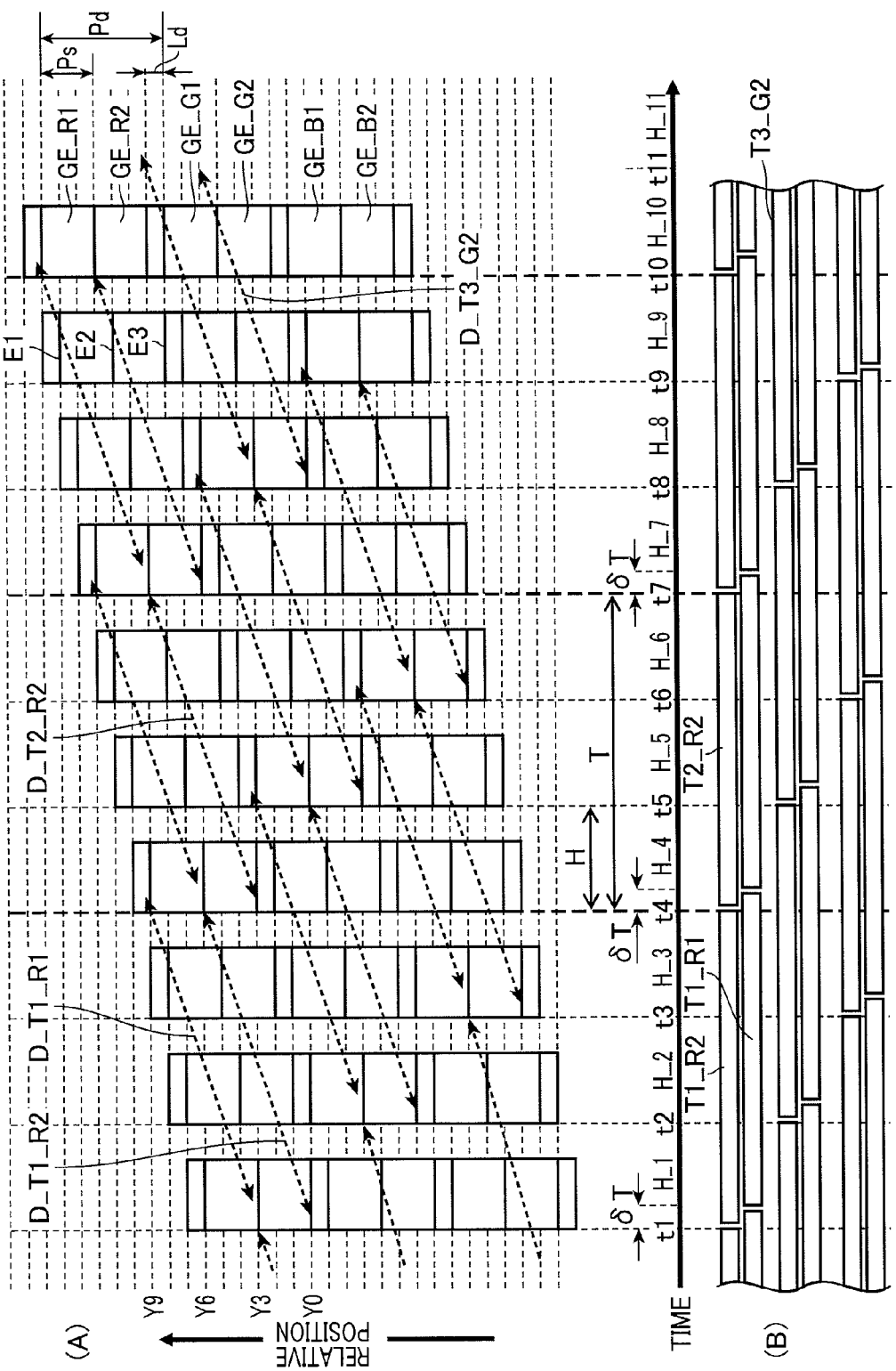
FIG. 8 at sections (A) and (B) is a diagram showing an exposure period of each pixel array which is movable in a vertical direction.

FIG. 8 at sections (A) and (B) is a diagram showing an exposure period for obtaining a pixel signal from each of the pixel arrays 100 which are moved in a vertical direction. In the sections (A) and (B) of FIG. 8, the pixel unit 1 is moved upwardly in a vertical direction. In the sections (A) and (B) of FIG. 8, each rectangle indicates one pixel GE in one pixel array 100.

The moving speed V of the pixel unit 1 is set to V=Ps/T. One scale in a vertical direction of the section (A) of FIG. 8 indicates a moving distance of the pixel unit 1 during a horizontal processing period H. Since T=3H, the one scale is Ps/3. The arrangement interval Pd between the pixel array groups 10 is set to Pd=7Ps/3. Therefore, the length Ld of the interval region 13 in a vertical direction is: Ld=Pd−2Ps=Ps/3.

During a frame period T1_R2, the forward end E2 of the pixel GE_R2 is moved in the range from the position Y3 to the position Y6. Accordingly, the exposure start position of the frame D_T1_R2 of the pixel GE_R2 is set to the position Y0, and the exposure end position thereof is set to the position Y6.

Further, during a frame period T3_G2, the forward end E2 of the pixel GE_G2 is moved in the range from the position Y3 to the position Y6. Accordingly, the exposure start position of the frame D_T3_G2 of the pixel GE_G2 is set to the position Y0, and the exposure end position thereof is set to the position Y6. Thus, the frame D_T3_G2 is located in the same region as the frame D_T1_R2.

The pixel signal of the frame D_T1_R2 is outputted to the readout section 20 during the horizontal processing period H_4, and the pixel signal of the frame D_T3_G2 is outputted to the readout section 20 during the horizontal processing period H_11.

Accordingly, the pixel signal to be outputted from the pixel GE_G2 is a pixel signal obtained at the same subject position as the pixel signal to be outputted from the pixel GE_R2 at a timing preceding by two frame periods 2T. Further, the sequence diagram of the section (A) of FIG. 8 also shows that the pixel signal to be outputted from the pixel GE_B2 is a pixel signal obtained at the same subject position as the pixel signal to be outputted from the pixel GE_G2 at a timing preceding by two frame periods 2T.

Thus, the pixels GE_R2, GE_G2, and GE_B2 are operable to output pixel signals at the same subject position as each other.

The pixel signal output timings from the pixels GE_R1, GE_G1, and GE_B1 are respectively delayed by δT from the start timing of the horizontal processing period H. However, since pixel signals are sequentially outputted at an interval of the frame period T, it is possible to output pixel signals from the pixels GE_R1, GE_G1, and GE_B1 at the same subject position as each other in the same manner as the pixels GE_R2, GE_G2, and GE_B2.

During a frame period T1_R1, the forward end E1 of the pixel GE_R1 is moved in the range from the position Y6+V*δT to the position Y9+V*δT. Accordingly, the exposure start position of a frame D_T1_R1 of the pixel GE_R1 is set to the position Y3+V*δT, and the exposure end position thereof is set to the position Y9+V*δT.

Further, during a frame period T2_R2, the forward end E1 of the pixel GE_R2 is moved in the range from the position Y6 to the position Y9. Accordingly, the exposure start position of a frame D_T2_R2 of the pixel GE_R2 is set to the position Y3, and the exposure end position thereof is set to the position Y9. In this example, if δT is set to a short time, the frame D_T1_R1 is located substantially at the same subject position as the frame D_T2_R2.

The pixel signal of the frame D_T1_R2 is outputted to the readout section 20 at the timing t4 during the horizontal processing period H_4, and the pixel signal of the frame D_T2_R2 is outputted to the readout section 20 at the timing t7+δT during the horizontal processing period H_7.

Accordingly, the pixel signal to be outputted from the pixel GE_R2 is a pixel signal obtained substantially at the same subject position as the pixel signal to be outputted from the pixel GE_R1 at a timing preceding substantially by one frame period T. Further, the sequence diagram of the section (A) of FIG. 8 also shows that the pixel signal to be outputted from the pixel GE_G2 is a pixel signal obtained substantially at the same subject position as the pixel signal to be outputted from the pixel GE_G1 at a timing preceding by one frame period T, and the pixel signal to be outputted from the pixel GE_B2 is a pixel signal obtained substantially at the same subject position as the pixel signal to be outputted from the pixel GE_B1 at a timing preceding by one frame period T.

As described above, it is possible to perform TDI for each of R pixels, G pixels, and B pixels by exposing the pixel GE_R1 and the pixel GE_R2, the pixel GE_G1 and the pixel GE_G2, and the pixel GE_B1 and the pixel GE_B2, respectively and substantially at the same subject position as each other.

Figure 9:
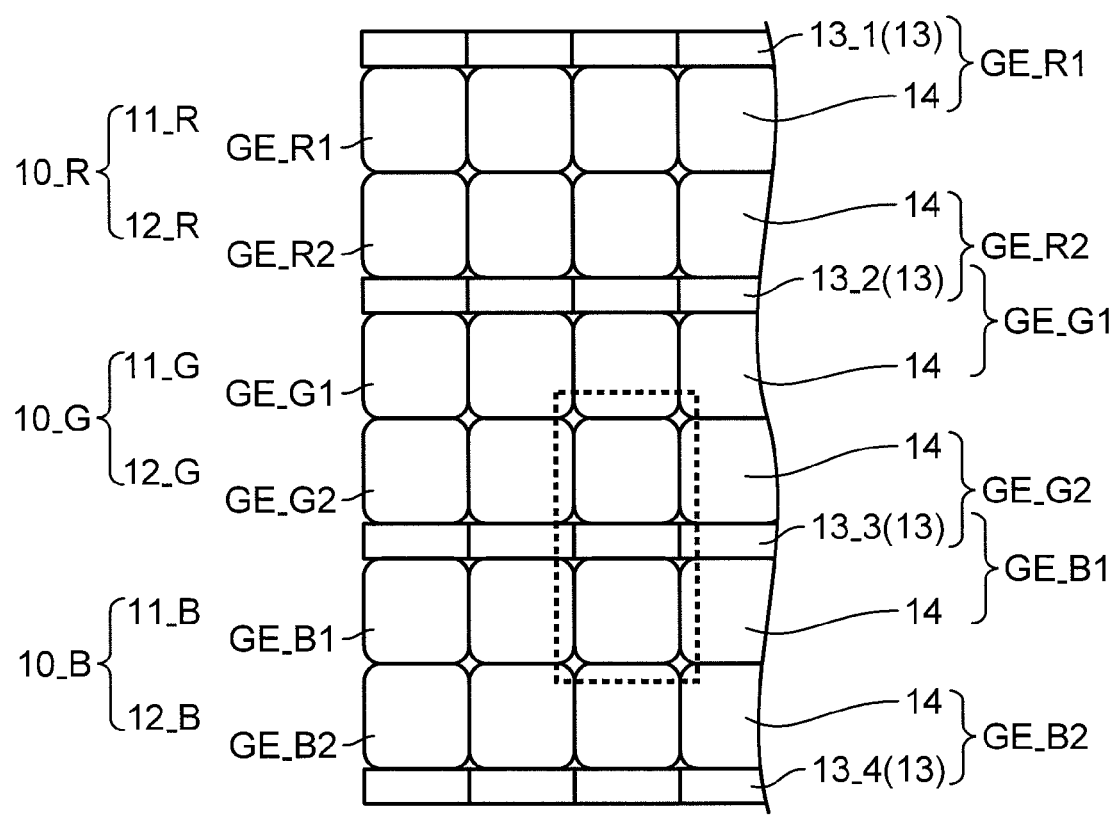
FIG. 9 is a diagram showing an arrangement example of pixel arrays.

FIG. 9 is a diagram showing an arrangement example of the pixel arrays 100. Each of the pixel arrays 100 is provided with an interval region 13 and a light receiving region 14. The pixel circuit GC shown in FIG. 3 is disposed in the interval region 13, and a photoelectric conversion section PD is disposed in the light receiving region 14.

Specifically, the pixel circuits GC for the pixel array 11_R are disposed in an interval region 13_1. Further, the pixel circuits GC for the pixel array 12_R and the pixel array 11_G are disposed in an interval region 13_2. Further, the pixel circuits GC for the pixel array 12_G and the pixel array 11_B are disposed in an interval region 13_3. Further, the pixel circuits GC for the pixel array 12_B are disposed in an interval region 13_4.

The two pixel arrays 12_R and 11_G which are disposed as opposed to each other with respect to a boundary between the pixel array group 10_R and the pixel array group 10_G are configured in such a manner that circuit elements as parts of the pixel circuits GC of a symmetrically arranged pair of pixels GE_R2 and GE_G1 are arranged symmetrically to each other with respect to the boundary, in other words, specularly arranged with respect to the boundary; and that circuit elements as parts of the pixel circuits GC of a symmetrically arranged pair of pixels GE_G2 and GE_B1 are also arranged symmetrically to each other with respect to the boundary in the same manner as the pixels GE_R2 and GE_G1.

Further, the pixels GE_R2 and GE_G1 share circuit elements as parts of the pixel circuits GC thereof, and the pixels GE_G2 and GE_B1 share circuit elements as parts of the pixel circuits GC thereof, respectively.

Figure 10:
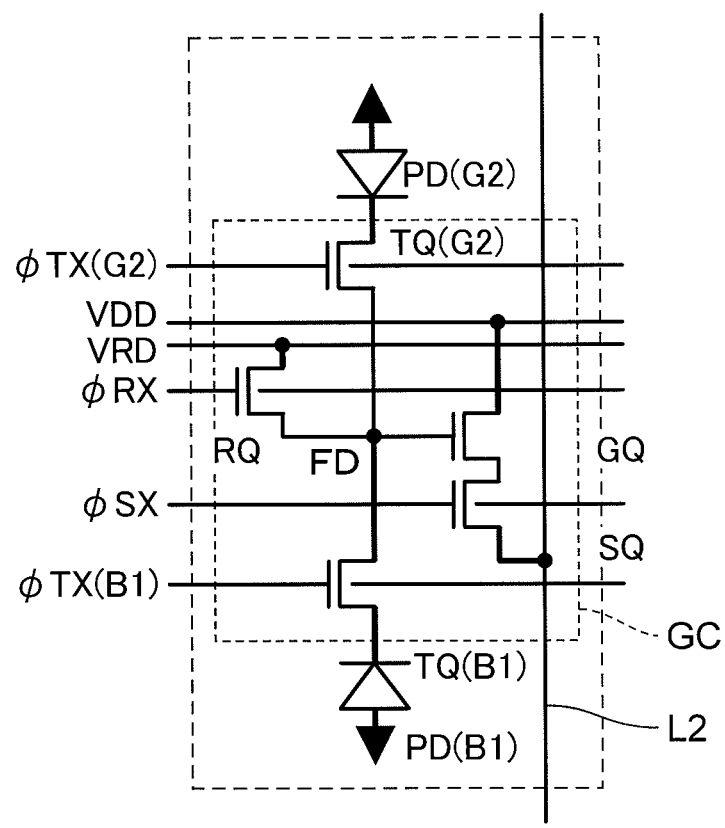
FIG. 10 is a circuit diagram of a pair of pixels which are arranged symmetrically to each other with respect to a boundary.

FIG. 10 is a circuit diagram of the paired pixel GE_G2 and the pixel GE_B1 which are arranged symmetrically to each other with respect to the boundary. As shown in FIG. 10, a reset transistor RQ, an FD, an amplification transistor GQ, and a row selection transistor SQ are shared between the pixels GE_G2 and GE_B1.

The above configuration is advantageous in reducing the number of circuit elements constituting a pixel circuit GC, as compared with a configuration that a pixel circuit GC is provided in each of the pixels GE_G2 and GE_B1. Thus, it is possible to secure a sufficient area for the light receiving region 14, even if the size of the pixel unit 1 is reduced. This is advantageous in obtaining a pixel signal of a high S/N ratio.

Further, the circuit elements as parts of the pixel circuits GC of the pixels GE_G2 and GE_B1 are arranged symmetrically with respect to the boundary. Specifically, transfer transistors TQ(G2) and TQ(B1) are disposed equidistantly away from each other with respect to the FD. Further, photoelectric conversion sections PD(G2) and PD(B1) are also disposed equidistantly away from each other with respect to the FD. Accordingly, it is possible to make the wire capacity from the photoelectric conversion section PD(G2) to the FD, and the wire capacity from the photoelectric conversion section PD(B1) to the FD equal to each other. This is advantageous in suppressing a variation in pixel signals between pixels.

Further, since an amplification transistor GQ and a row selection transistor SQ are shared, it is possible to make the line path length from the FD to the readout section 20 with respect to a pixel signal to be outputted from the photoelectric conversion section PD(G2), and the line path length from the FD to the readout section 20 with respect to a pixel signal to be outputted from the photoelectric conversion section PD(B1) equal to each other. The pixels GE_R2 and GE_G1 have the same circuit configuration as the circuit configuration shown in FIG. 10.

Figure 11:
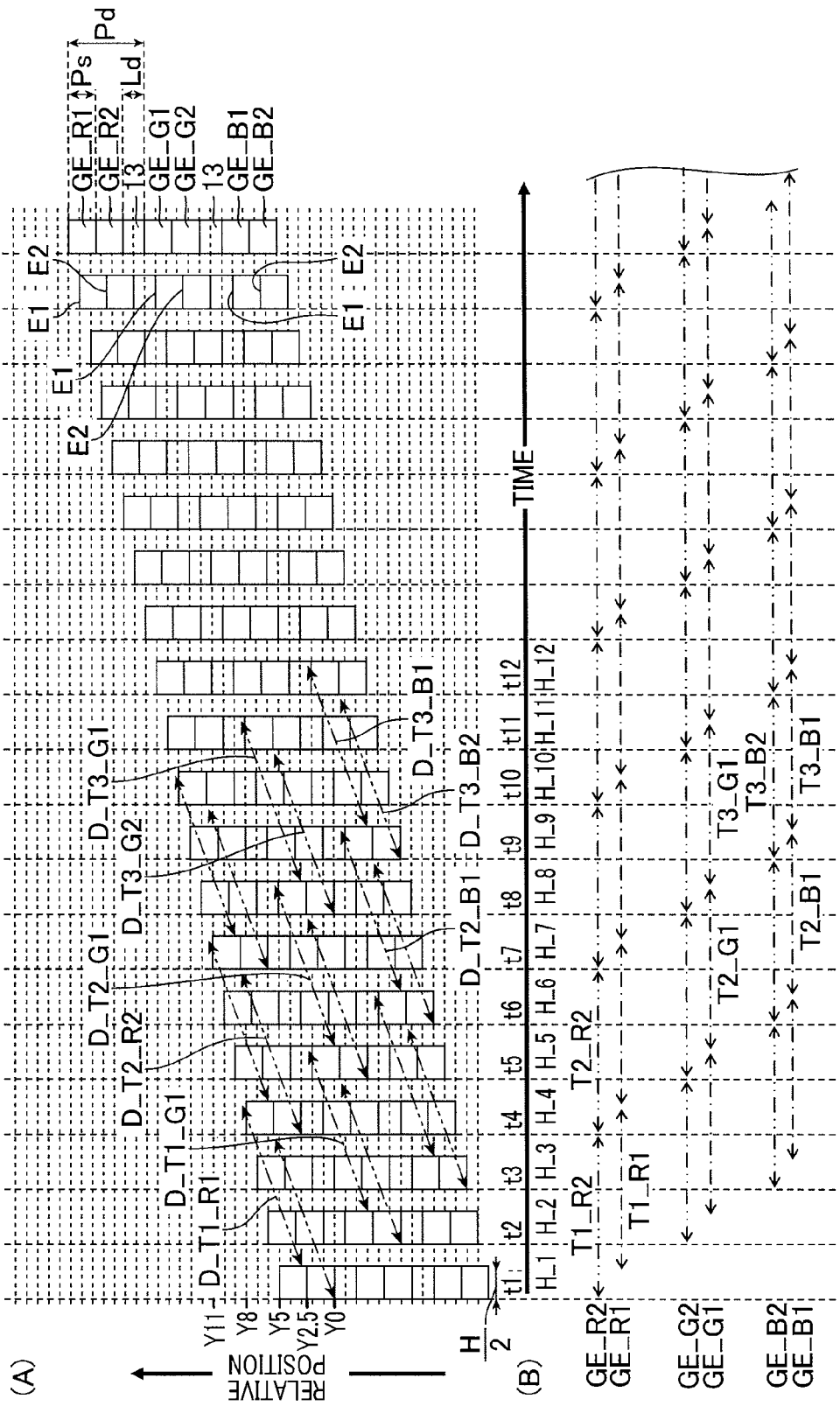
FIG. 11 at sections (A) and (B) is a diagram showing an exposure period of each pixel array, in the case where exposure start positions of two pixel arrays constituting each pixel array group are aligned with each other in reading out a pixel signal in the order of R, G, and B.

FIG. 11 at sections (A) and (B) is a diagram showing an exposure period of each of the pixel arrays 100 in the case where the exposure start positions of two pixel arrays 100 constituting each of the pixel array groups 10 are aligned with each other in reading out a pixel signal in the order of R, G, and B.

In the example of FIG. 8, since Pd=7Ps/3, the exposure start position of each of the pixel arrays 100 in each of the pixel array groups 10 is displaced by V*δT. In order to prevent the displacement, in the example of FIG. 11, δT=H/2, Ps=2.5V*H(=(3−0.5)*V*H), and Pd=7Ps/2.5. Therefore, Ld=Pd−2Ps=2V*H.

During a frame period T1_R1, the forward end E1 of the pixel GE_R1 is moved in the range from the position Y5.5 (=Y5+0.5H*V) to the position Y8.5(=Y8+0.5H*V). In this example, the frame period T1_R1 is a time duration from the timing t1+0.5H, which is a point of time after elapse of 0.5H from the start timing t1 of the horizontal processing period H1_1 to the timing t4+0.5H, which is a point of time after lapse of 0.5H from the start timing t4 of the horizontal processing period H_4. Therefore, the exposure start position of the frame D_T1_R1 of the pixel GE_R1 is set to the position Y3(=Y2.5+0.5H*V), and the exposure end position thereof is set to the position Y8.5(=Y8+0.5H*V).

Further, during a frame period T2_R2, the forward end E2 of the pixel GE_R2 is moved in the range from the position Y5.5 to the position Y8.5. In this example, the frame period T2_R2 is a time duration from the start timing t4 of the horizontal processing period H_2 to the start timing t7 of the horizontal processing period H_7.

Therefore, the exposure start position of the frame D_T2_R2 of the pixel GE_R2 is set to the position Y3, and the exposure end position thereof is set to the position Y8.5. Thus, the frame D_T2_R2 is located in the same region as the frame D_T1_R1.

The pixel signal of the frame D_T1_R1 is outputted to the readout section 20 during the horizontal processing period H_4, and the pixel signal of the frame D_T2_R2 is outputted to the readout section 20 during the horizontal processing period H_7.

Accordingly, the pixel signal to be outputted from the pixel GE_R2 is a pixel signal obtained at the same subject position as the pixel signal to be outputted from the pixel GE_R1 at a timing preceding by one frame period T.

Further, as is obvious from the frames D_T2_G1 and D_T3_G2, the pixel signal to be outputted from the pixel GE_G2 is a pixel signal obtained at the same subject position as the pixel signal to be outputted from the pixel GE_G1 at a timing preceding by one frame period T.

Further, as is obvious from the frames D_T2_B1 and D_T3_B2, the pixel signal to be outputted from the pixel GE_B2 is a pixel signal obtained at the same subject position as the pixel signal to be outputted from the pixel GE_B1 at a timing preceding by one frame period T.

Accordingly, it is possible to output pixel signals at the same subject position as each other from the pixel arrays 11_R and 12_R, output pixel signals at the same subject position as each other from the pixel arrays 11_G and 12_G, and output pixel signals at the same subject position as each other from the pixel arrays 11_B and 12_B.

During a frame period T1_R1, the pixel GE_R1 is exposed at the frame D_T1_R1. The exposure start position of the frame D_T1_R1 is set to the position Y3(=Y2.5+0.5H*V), and the exposure end position thereof is set to the position Y8.5(=Y8+0.5H*V).

Further, during a frame period T3_G1, the forward end E2 of the pixel GE_G1 is moved in the range from the position Y5.5(=Y5+0.5H*V) to the position Y8.5(=Y8+0.5H*V). In this example, the frame period T3_G1 is a time duration from the timing t8+0.5H, which is a point of time after lapse of 0.5H from the start timing t8 of the horizontal processing period H_8 to the timing t11+0.5H, which is a point of time after lapse of 0.5H from the start timing t11 of the horizontal processing period H_11.

Therefore, the exposure start position of the frame D_T3_G1 of the pixel GE_G1 is set to the position Y3, and the exposure end position thereof is set to the position Y8.5. Thus, the frame D_T3_G1 is located at the same subject position as the frame D_T1_R1.

The pixel signal of the frame D_T1_R1 is outputted to the readout section 20 during the horizontal processing period H_4, and the pixel signal of the frame D_T3_G1 is outputted to the readout section 20 during the horizontal processing period H_11.

Accordingly, the pixel signal to be outputted from the pixel GE_G1 is a pixel signal obtained at the same subject position as the pixel signal to be outputted from the pixel GE_R1 at a timing preceding by two frame periods 2T.

Further, as is obvious from the frames D_T1_G1 and D_T3_B1, the pixel signal to be outputted from the pixel GE_B1 is a pixel signal obtained at the same subject position as the pixel signal to be outputted from the pixel GE_G1 at a timing preceding by two frame periods 2T.

Thus, it is possible to output pixel signals from the pixel arrays 100 at the same subject position as each other.

Figure 12:
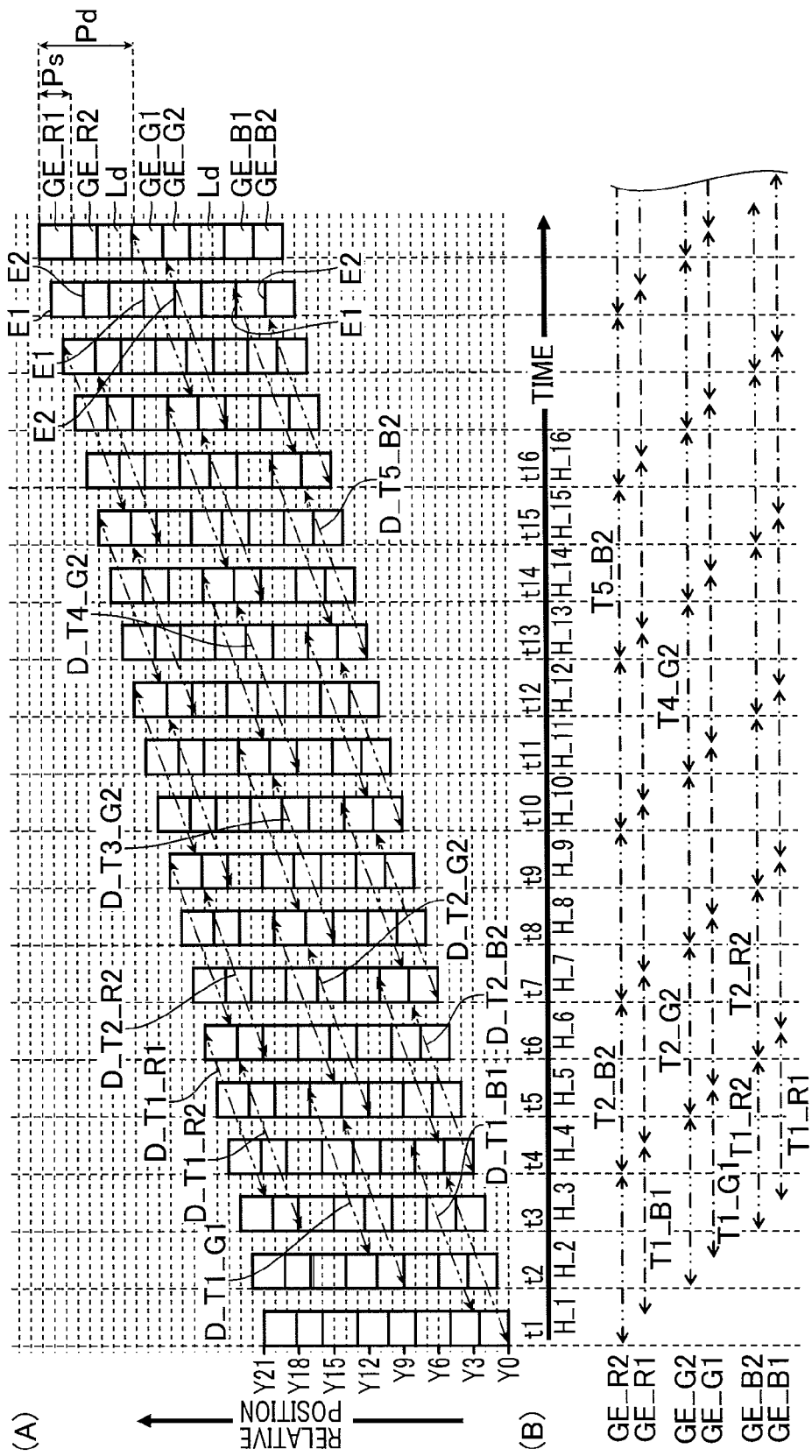
FIG. 12 at sections (A) and (B) is a diagram showing an exposure period of each pixel array, in the case where exposure start positions of two pixel arrays constituting each pixel array groups are aligned with each other in reading out a pixel signal in the order of B, G and R.

FIG. 12 at sections (A) and (B) is a diagram showing an exposure period of each of the pixel arrays 100 in the case where the exposure start positions of two pixel arrays 100 constituting each of the pixel array groups 10 are aligned with each other in reading out a pixel signal in the order of B, G, and R.

In the example of FIG. 11, pixel signals are read out in the order of R, G, and B. In the example of FIG. 12, pixel signals are read out in the order of B, G, and R. Further, in the example of FIG. 12, δT=H/2, Ps=2.5V*H, and Pd=8Ps/2.5 to expose each of the pixel arrays 100 at the same subject position. Therefore, Ld=3H*V.

During a frame period T1_B1, the forward end E1 of the pixel GE_B1 is moved in the range from the position Y5.5 (=Y5+0.5H*V) to the position Y8.5(=Y8+0.5H*V). In this example, the frame period T1_B1 is a time duration from the timing t1+0.5H, which is a point of time after elapse of 0.5H from the start timing t1 of the horizontal processing period H1_1 to the timing t4+0.5H, which is a point of time after lapse of 0.5H from the start timing t4 of the horizontal processing period H_4. Therefore, the exposure start position of the frame D_T1_B1 of the pixel GE_B1 is set to the position Y3(=Y2.5+0.5H*V), and the exposure end position thereof is set to the position Y8.5(=Y8+0.5H*V).

Further, during a frame period T2_B2, the forward end E2 of the pixel GE_B2 is moved in the range from the position Y5.5 to the position Y8.5. In this example, the frame period T2_B2 is a time duration from the start timing t4 of the horizontal processing period H_2 to the start timing t7 of the horizontal processing period H_7.

Therefore, the exposure start position of the frame D_T2_B2 of the pixel GE_B2 is set to the position Y3, and the exposure end position thereof is set to the position Y8.5. Thus, the frame D_T2_B2 is located at the same subject position as the frame D_T1_B1.

The pixel signal of the frame D_T1_B1 is outputted to the readout section 20 during the horizontal processing period H_4, and the pixel signal of the frame D_T2_B2 is outputted to the readout section 20 during the horizontal processing period H_7.

Accordingly, the pixel signal to be outputted from the pixel GE_B2 is a pixel signal obtained at the same subject position as the pixel signal to be outputted from the pixel GE_B1 at a timing preceding by one frame period T.

Further, as is obvious from the frames D_T1_G1 and D_T2_G2, the pixel signal to be outputted from the pixel GE_G2 is a pixel signal obtained at the same subject position as the pixel signal to be outputted from the pixel GE_G1 at a timing preceding by one frame period T.

Further, as is obvious from the frames D_T1_R1 and D_T2_R2, the pixel signal to be outputted from the pixel GE_R2 is a pixel signal obtained at the same subject position as the pixel signal to be outputted from the pixel GE_R1 at a timing preceding by one frame period T.

Accordingly, it is possible to output pixel signals at the same subject position as each other from the pixel arrays 11_B and 12_B, output pixel signals at the same subject position as each other from the pixel arrays 11_G and 12_G, and output pixel signals at the same subject position as each other from the pixel arrays 11_R and 12_R.

During a frame period T2_G2, the pixel GE_G2 is exposed at a frame D_T2_G2. The exposure start position of the frame D_T2_G2 is set to the position Y12, and the exposure end position thereof is set to the position Y17.5.

Further, during a frame period T5_B2, the forward end E2 of the pixel GE_B2 is moved in the range from the position Y14.5 to the position Y17.5. In this example, the frame period T5_B2 is a time duration from the start timing t13 of the horizontal processing period H_13 to the start timing t16 of the horizontal processing period H_16.

Therefore, the exposure start position of the frame D_T5_B2 of the pixel GE_B2 is set to the position Y12, and the exposure end position thereof is set to the position Y17.5. Thus, the frame D_T5_B2 is located in the same region as the frame D_T2_G2.

The pixel signal of the frame D_T2_G2 is outputted to the readout section 20 during the horizontal processing period H_8, and the pixel signal of the frame D_T5_B2 is outputted to the readout section 20 during the horizontal processing period H_16.

Accordingly, the pixel signal to be outputted from the pixel GE_B2 is a pixel signal obtained at the same subject position as the pixel signal to be outputted from the pixel GE_G2 at a timing preceding by three frame periods 3T.

Further, as is obvious from the frames D_T1_R2 and D_T4_G2, the pixel signal to be outputted from the pixel GE_G2 is a pixel signal obtained at the same subject position as the pixel signal to be outputted from the pixel GE_R2 at a timing preceding by three frame periods 3T. Thus, it is possible to output pixel signals from the pixel arrays 100 at the same subject position as each other.

Figure 13:
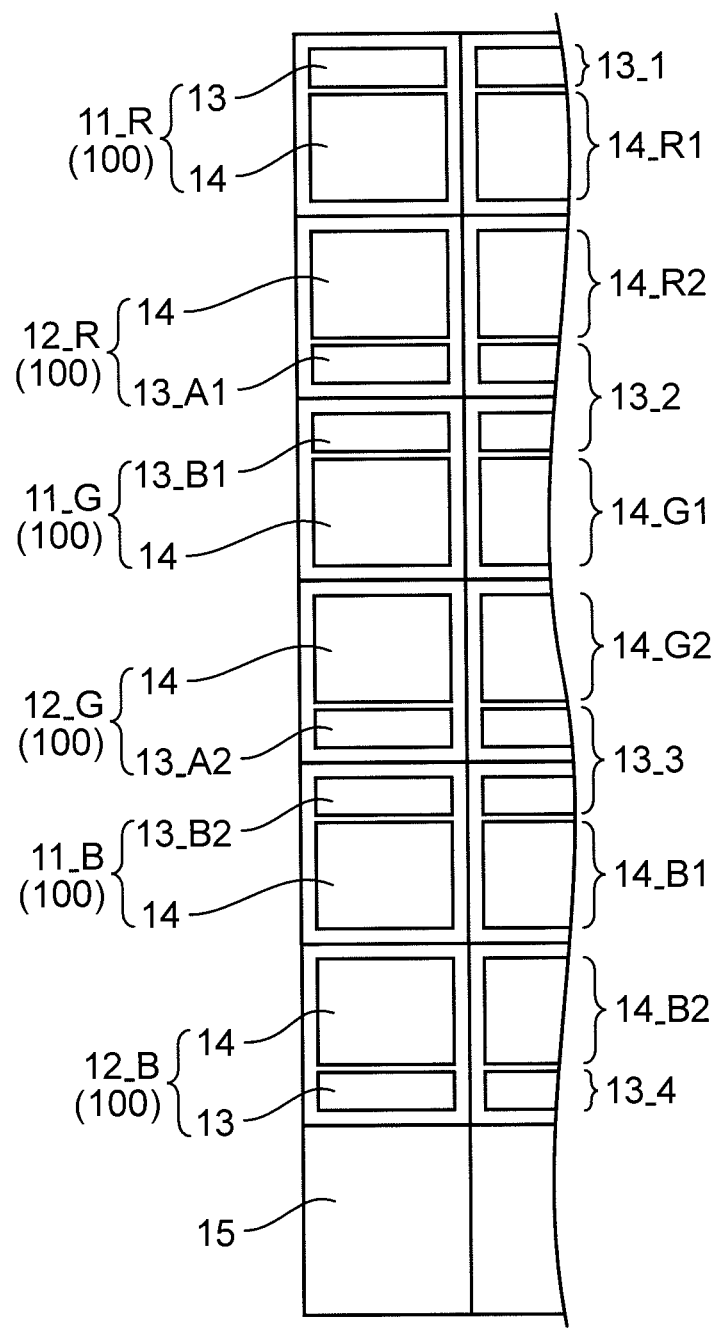
FIG. 13 is a diagram showing a modification of the arrangement example of pixel arrays shown in FIG. 9.

FIG. 13 is a diagram showing a modification of the arrangement example of the pixel arrays 100 shown in FIG. 9. In the arrangement example shown in FIG. 9, the pixel arrays 12_R and 11_G, share reset transistors RQ, amplification transistors GQ, and row selection transistors SQ; and the pixel arrays 12_G and 11_B share reset transistors RQ, amplification transistors GQ, and row selection transistors SQ, respectively. In the arrangement example shown in FIG. 13, all the pixel arrays 100 share reset transistors RQ, amplification transistors GQ, and row selection transistors SQ.

Further, in the arrangement example shown in FIG. 13, an interval region 132 in a boundary between the pixel arrays 12_R and 11_G is divided into two sub interval regions i.e. a sub interval region 13_A1 of the pixel array 12_R and a sub interval region 13_B1 of the pixel array 11_G. Likewise, an interval region 13_3 in a boundary between the pixel arrays 12_G and 11_B is divided into two sub interval regions i.e. an interval region 13_A2 of the pixel array 12_G and an interval region 13_B2 of the pixel array 11_B.

Figure 14:
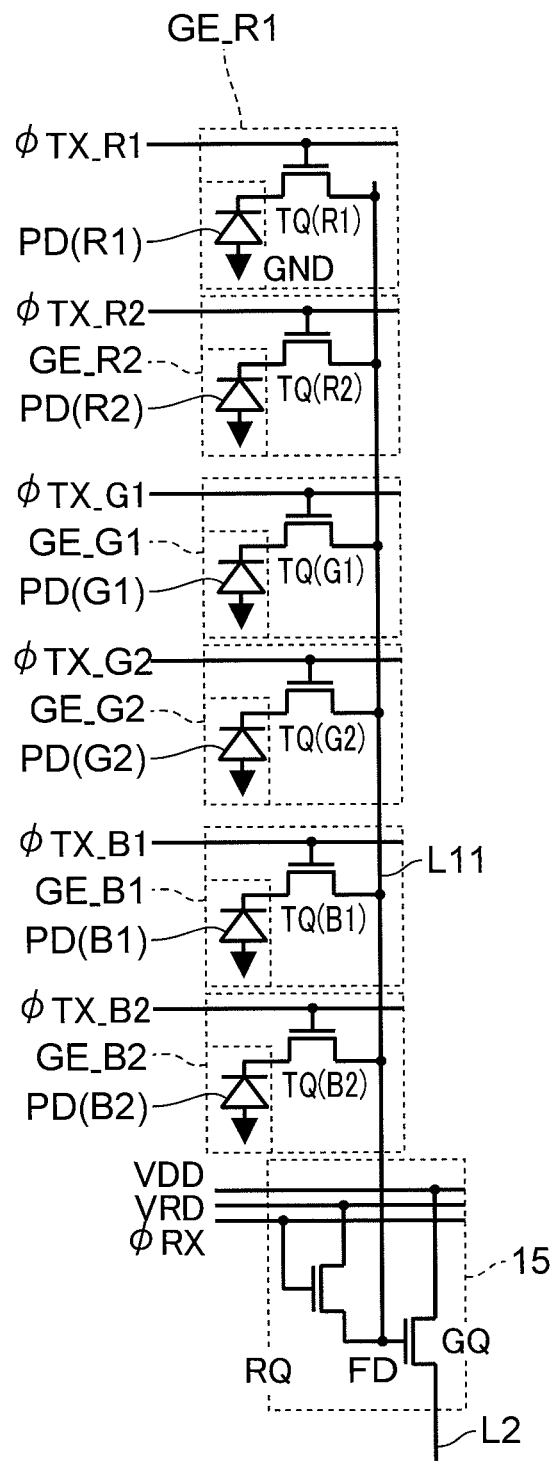
FIG. 14 is a circuit diagram for the arrangement example shown in FIG. 13.

FIG. 14 shows a circuit diagram for the arrangement example shown in FIG. 13. Six pixels GE_R1, GE_R2, GE_G1, GE_G2, GE_B1, and GE_B2 shown in FIG. 14 respectively indicate six pixels in a certain column of the pixel arrays 11_R, 12_R, 11_G, 12_G, 11_B, and 12B.

Photoelectric conversion sections PD(R1), PD(R2), PD(G1), PD(G2), PD(B1), and PD(B2) are respectively disposed in light receiving regions 14_R1, 14_R2, 14_G1, 14_G2, 14_B1, and 14 B2 shown in FIG. 13.

Six transfer transistors TQ(R1), TQ(R2), TQ(G1), TQ(G2), TQ(B1), and TQ(B2) are respectively disposed in the interval regions 13_1, 13_A1, 13_B1, 13_A2, 13_B2, and 13_4.

An FD is connected to each of the six transfer transistors TQ via one line path L11, and is shared by the six pixels GE. One end of the reset transistor RQ is connected to the FD. A gate of the amplification transistor GQ is connected to the FD. The reset transistor RQ and the amplification transistor GQ are each shared by the six pixels GE.

A reset transistor RQ, an FD, and an amplification transistor GQ are disposed in a sharing region 15 shown in FIG. 13. The sharing region 15 is provided at a lower side of the pixel array 12_B. Further, referring to FIG. 14, the transfer transistor TQ has the function of the row selection transistor SQ shown in FIG. 3, in addition to the function of transferring a signal charge.

Figure 15:
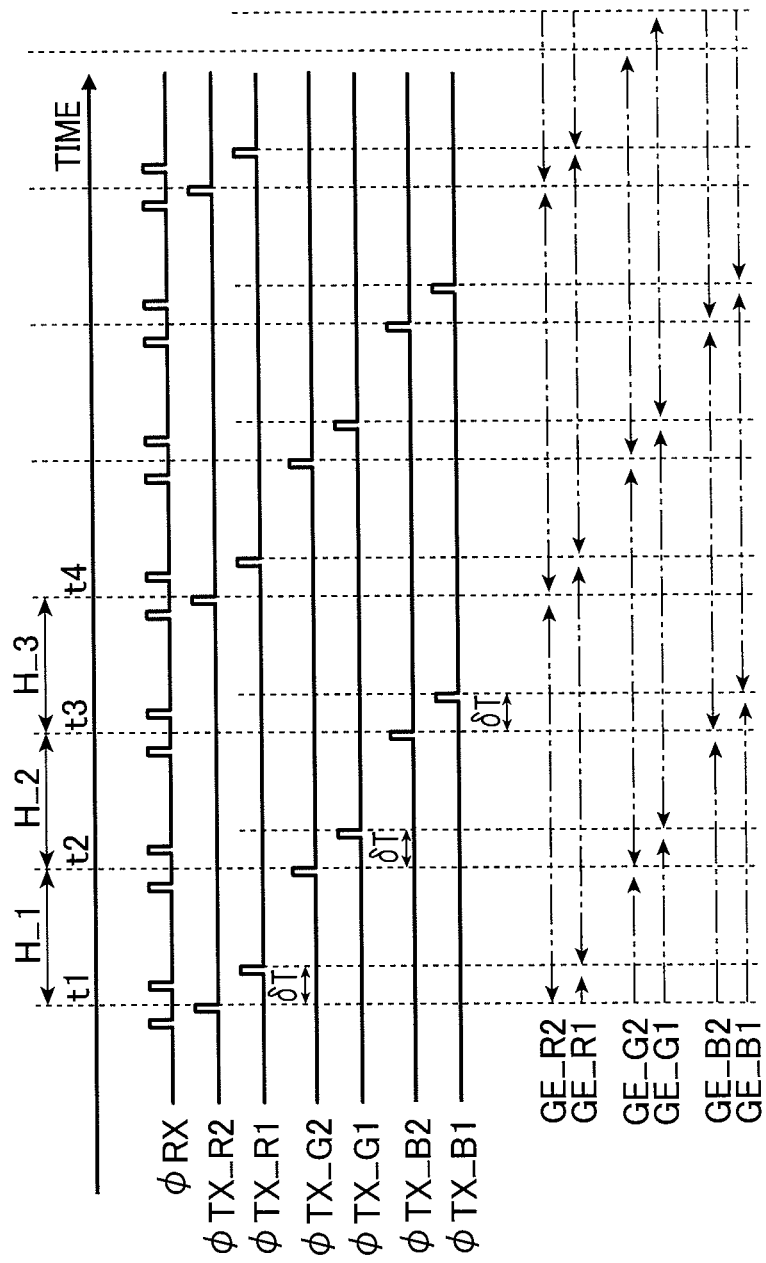
FIG. 15 is a timing chart of the circuit shown in FIG. 14.

FIG. 15 shows a timing chart of the circuit shown in FIG. 14. At a point of time a little bit earlier than the timing t1, a signal φRX is turned on for a predetermined period. Then, the FD is reset, and a signal of the reset level of the FD is outputted as a pixel signal corresponding to a noise component to the vertical signal line L2 via the amplification transistor GQ. Since the processings for B pixels and G pixels are the same as the processing for R pixels, merely the processing for R pixels is described herein.

At the timing t1, a signal φTX_R2 is turned on for a predetermined period. Then, a signal charge accumulated in the photoelectric conversion section PD(R2) is transferred to the FD, and outputted to the vertical signal line L2 via the amplification transistor GQ. By performing the above operation, a pixel signal of a frame which is obtained by the pixel GE_R2 is outputted to the readout section 20.

At the timing t1+δT, a signal φTX_R1 is turned on. Then, a signal charge accumulated in the photoelectric conversion section PD(R1) is transferred to the FD, and outputted to the vertical signal line L2 via the amplification transistor GQ. By performing the above operation, a pixel signal of a frame which is obtained by the pixel GE_R1 is outputted to the readout section 20.

Likewise, during the horizontal processing period H_2, the same processing as applied to the pixels GE_R1 and GE_R2 is performed for the pixels GE_G1 and GE_G2; and during the horizontal processing period H_3, the same processing as applied to the pixels GE_R1 and GE_R2 is performed for the pixels GE_B1 and GE_B2.

Figure 16:
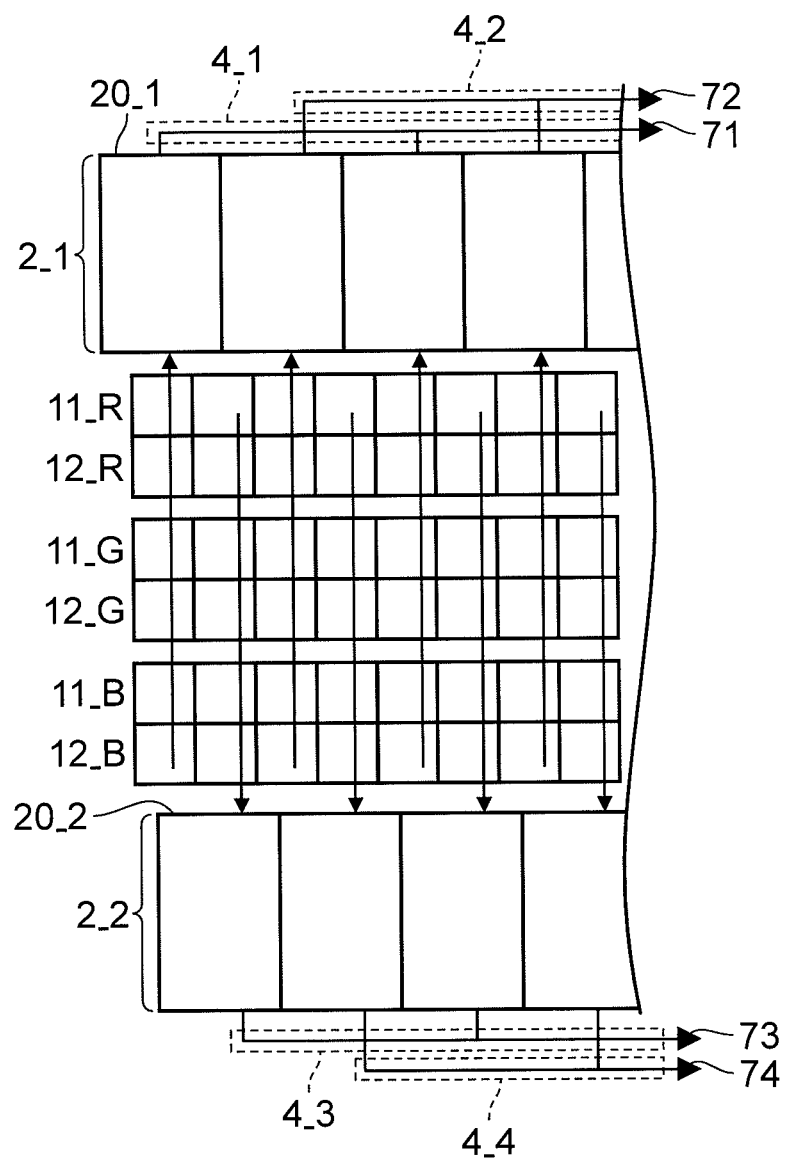
FIG. 16 is a diagram showing an arrangement example, in the case where the readout unit shown in FIG. 1 is divided into two sub read-out units.

FIG. 16 is a diagram showing an arrangement example, in the case where the readout unit 2 shown in FIG. 1 is divided into two sub readout units 2_1 and 2_2. The sub readout unit 2_1 is disposed on the upper side of the pixel array 11_R, and the sub readout unit 2_2 is disposed on the lower side of the pixel array 12_B.

The sub readout unit 2_1 is provided with a plurality of sub readout sections 20_1 for reading out pixel signals from every-odd numbered pixels GE from the left end of the pixel unit 1. The sub readout unit 2_2 is provided with a plurality of sub readout sections 20_2 for reading out pixel signals from every-even numbered pixels GE from the left end of the pixel unit 1.

Further, the sub readout unit 2_1 is provided with a sub horizontal scanning circuit 4_1 for horizontally scanning the sub readout sections 20_1 at every odd-numbered pixels from the left end, and a sub horizontal scanning circuit 4_2 for horizontally scanning the sub readout sections 20_1 at every even-numbered pixels from the left end.

Further, the sub readout unit 2_2 is provided with a sub horizontal scanning circuit 43 for horizontally scanning the sub readout sections 20_2 at every odd-numbered pixels from the left end, and a sub horizontal scanning circuit 4_4 for horizontally scanning the sub readout sections 20_2 at every even-numbered pixels from the left end.

Next, an operation to be performed by the readout unit is described. Firstly, in response to selection of a certain pixel array 100 by the vertical scanning circuit 3, each of the sub readout sections 20_1 reads out a pixel signal from a corresponding odd-numbered pixel GE in the selected pixel array 100. Concurrently, each of the sub readout sections 20_2 reads out a pixel signal from a corresponding even-numbered pixel GE in the selected pixel array 100.

Then, the sub readout units 2_1 and 2_2 output the readout pixel signals to amplifiers 71 through 74 as pixel data after A/D conversion. In performing this operation, the sub horizontal scanning circuit 4_1 outputs, to the amplifier 71, a pixel signal from the pixel GE in the first column, and concurrently, the sub horizontal scanning circuit 4_2 outputs, to the amplifier 72, a pixel signal from the pixel GE in the third column.

Further, the sub horizontal scanning circuit 4_3 outputs, to the amplifier 73, a pixel signal from the pixel GE in the second column, and concurrently, the sub horizontal scanning circuit 4_4 outputs, to the amplifier 74, a pixel signal from the pixel GE in the fourth column.

Furthermore, concurrently when the sub readout unit 2_1 outputs, to the amplifiers 71 and 72, the pixel signal from the pixel GE in the first column and the pixel signal from the pixel GE in the third column, the sub readout unit 2_2 outputs, to the amplifiers 73 and 74, the pixel signal from the pixel GE in the second column, and the pixel signal from the pixel GE in the fourth column.

The sub readout units 2_1 and 2_2 cyclically repeat the aforementioned processing for the pixels GE in all the columns, whereby all the pixel data in one pixel array 100 is outputted.

With the above configuration, the time required for outputting pixel data corresponding to one pixel array by the sub readout units 2_1 and 2_2 is shortened to one-half of the time required in the configuration shown in FIG. 1. Thus, it is possible to perform a pixel signal readout operation at a high speed.

Figure 17:
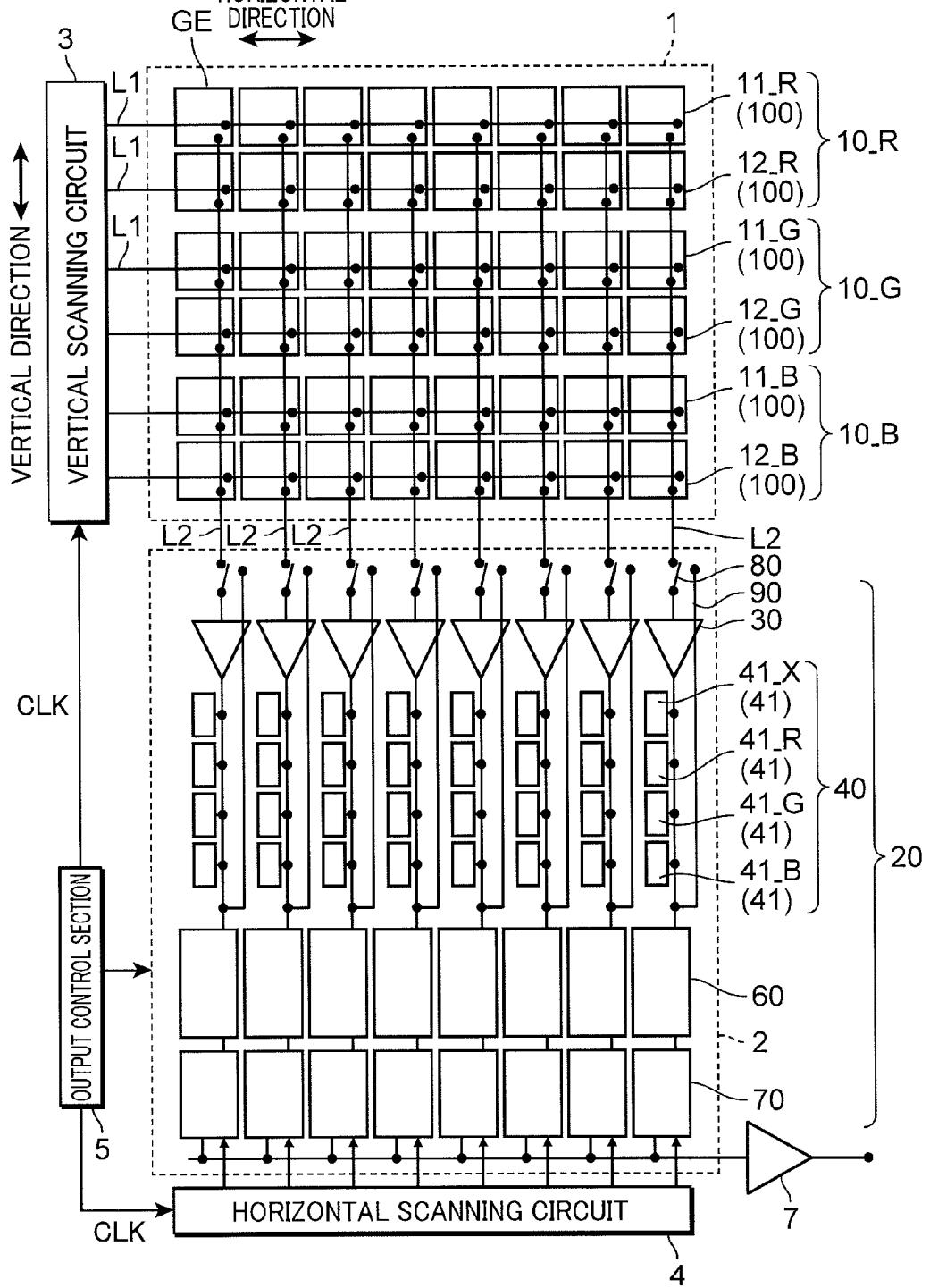
FIG. 17 is a configuration diagram of an image pickup device, in which a modification of the readout section shown in FIG. 1 is applied.

FIG. 17 is a configuration diagram of an image pickup device, in which a modification of the readout section 20 shown in FIG. 1 is applied. The readout section 20 shown in FIG. 17 is provided with a switch section 80 and a feedback loop 90, in place of the adder 50 which is provided for the readout section 20 shown in FIG. 1.

The switch section 80 is connected between the pixel unit 1 and the amplifier 30. The feedback loop 90 is connected between the output end of the signal holding portion 41_B and the switch section 80.

The switch section 80 is constituted of e.g. a transistor, and connects the amplifier 30 to the vertical signal line L2 or to the feedback loop 90 under the control of the output control section 5.

Next, an operation to be performed by the readout section 20 is described by taking an example of R pixels, referring to FIG. 17. The operation sequence of the image pickup device shown in FIG. 17 is substantially the same as that shown in FIG. 4 except for the first processing S1 through the third processing S3. Accordingly, in the following, the operation to be performed by the readout section 20 shown in FIG. 17 is described mainly on the differences.

In the first processing S1, the pixel array 12_R outputs a pixel signal V_R2. Further, in the first processing S1, the switch section 80 connects the amplifier 30 to the vertical signal line L2, and the output control section 5 causes the signal holding portion 41_X to hold the pixel signal V_R2 therein.

In the second processing S2, the switch section 80 connects the amplifier 30 to the feedback loop 90, and the output control section 5 causes the amplifier 30 to output the pixel signal V_R1 held in the signal holding portion 41_R via the feedback loop 90. Then, in the second processing S2, the amplifier 30 sums up the pixel signal V_R1 and the pixel signal V_R2, and outputs the summation result to the A/D converter 60.

In the third processing S3, the switch section 80 connects the amplifier 30 to the vertical signal line L2, and the output control section 5 causes the pixel array 11_R to output a pixel signal V_R1, and causes the signal holding portion 41_R to hold the pixel signal V_R1 therein.

The aforementioned processing is also executed for B pixels and G pixels. The aforementioned processing is executed in the order of R, G, and B at an interval of the horizontal processing period H.

The above configuration eliminates the need of providing an adder 50 in addition to an amplifier 30 by providing the amplifier 30 with the function of the adder 50. This is advantageous in reducing the circuit scale of the readout section 20.

(Configuration Using M Pixel Array Groups and N Pixel Arrays)

In this section, there is described a case, wherein the pixel unit 1 is constituted of M pixel array groups 10_1 through 10_M, and one pixel array group 10 is constituted of N pixel arrays 100_1 through 100_N. In this configuration, in the third processing S3, pixel signals are sequentially outputted in the order from the pixel array 100_N−1 to the pixel array 100N_1.

(Number of Signal Holding Portions)

As the number N of pixel arrays increases, the sensitivity increases and the S/N ratio enhances. However, the circuit scale of an addition circuit such as a signal holding portion 41 may increase. In view of the above, it is preferred to set the number N of pixel arrays to ten or less.

Since the pixel signals other than the pixel signals to be outputted from the last pixel array 100_N are used in a horizontal processing period H thereafter, it is necessary to hold the pixel signals by the readout sections 20. In view of the above, it is necessary to set the number of signal holding portions 41 to N−1 for each pixel array group, in other words, it is necessary to provide (N−1)*M or more signal holding portions 41. Further, as shown by the example of FIG. 1, in the case where a pixel signal to be outputted from the last pixel array 100_N is also held, it is necessary to set the number of signal holding portions 41 to (N−1)*M+1 or more.

The number of signal holding portions 41 should be $\Sigma_{n=1 \ to \ N}(n-1)$ for each pixel array group in order to perform TDI while individually holding the pixel signals to be outputted from the pixel arrays 100_1 through 100_N−1. In sum, $\Sigma_{n=1 \ to \ N}(n-1) \cdot M$ signal holding portions 41 are necessary.

Figure 18:
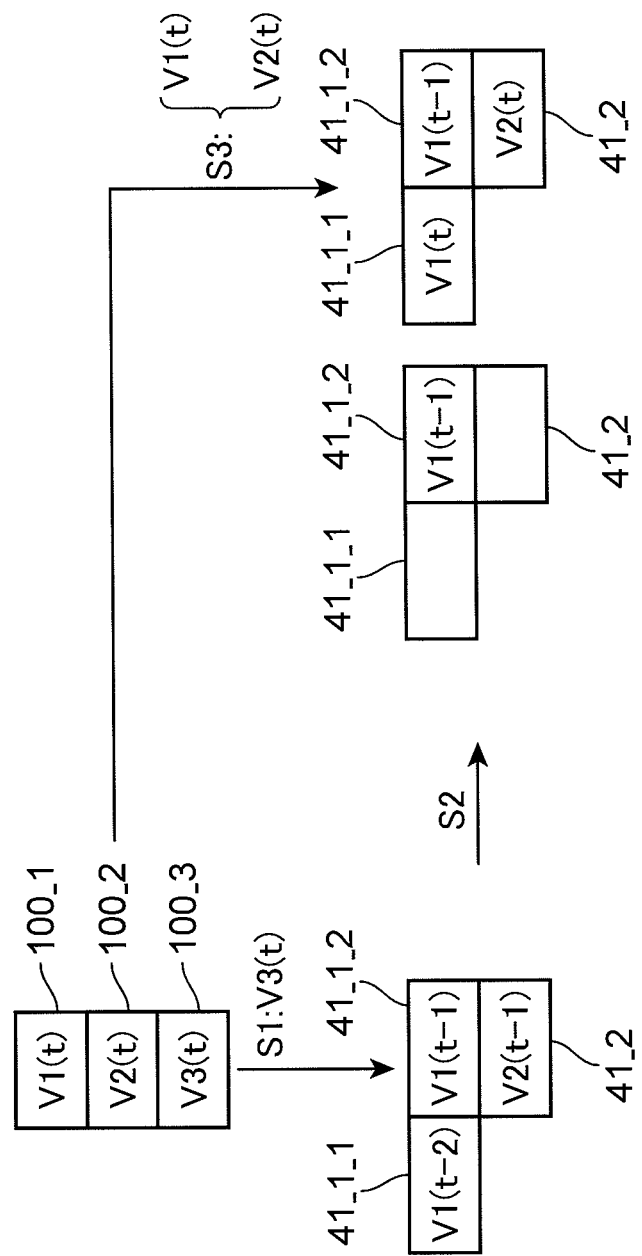
FIG. 18 is a diagram for explaining the number of signal holding portions necessary for one pixel array group, in the case where N=3.

FIG. 18 is a diagram for describing the number of signal holding portions 41 necessary for one pixel array group, in the case where N=3. In the case where N=3, three signal holding portions 41 are necessary for one pixel array group to satisfy the formula $\Sigma_{n=1 \ to \ N}(n-1) \cdot M$.

Referring to FIG. 18, V1(*t*), V2(*t*), and V3(*t*) respectively indicate pixel signals outputted from the pixel arrays 100_1, 100_2, and 100_3 during a horizontal processing period H_t.

In the first processing S1, the pixel signal V3(*t*) is outputted from the pixel array 100_3. In the second processing S2, the pixel signals V3(*t*), V1(*t*−2), and V2(*t*−1) are summed up. Accordingly, the signal holding portions 41_1_1 and 41_2 are emptied. In the third processing S3, the pixel signals V1(*t*) and V2(*t*) are respectively held in the signal holding portions 41_1_1 and 41_2.

As described above, in order to perform TDI for three pixel arrays, it is necessary to obtain the pixel signals V2(*t*−1) and V1(*t*−2) at the same subject position as the pixel signal V3(*t*) in the second processing S2. Further, the pixel signal V1(*t*−1) which has been outputted in the processing S3 during the horizontal processing period H_(t−1) is necessary during the next horizontal processing period H_(t+1). Therefore, it is necessary to hold the pixel signal V1(*t*−1) in the signal holding portion 41_12.

In view of the above, it is necessary to provide two signal holding portions 41_1_1 and 41_1_2 for holding pixel signals of two frames to be outputted from the pixel array 100_1, and one signal holding portion 41_2 for holding a pixel signal of one frame to be outputted from the pixel array 100_2. Thus, in the case where N=3, three signal holding portions 41 are necessary for one pixel array group.

In this example, the pixel signal V2(*t*) is a pixel signal obtained at the same subject position as the pixel signal V1(*t*−1). Accordingly, in the third processing S3, a configuration of writing the pixel signal V2(*t*) over the pixel signal V1(*t*−1) may be employed. In the modification, only one signal holding portion 41 is necessary for the pixel array 100_1, and the required number of signal holding portions 41 for one pixel array group is two. Accordingly, in the case where N pixel arrays are provided, the required number of signal holding portions 41 for one pixel array group is N−1. In sum, the required total number of signal holding portions 41 is (N−1)*M. Thus, reduction in the number of signal holding portions 41 is advantageous in reducing the circuit scale of the readout section 20.

(Adder 50)

The adder 50 may preferably be an analog adder for summing up analog pixel signals. In the case where the adder 50 is constituted of a digital adder, it is necessary to A/D convert a pixel signal to be outputted from each of the pixel arrays. This may increase the number of times of A/D conversion. In view of the above, constituting the adder 50 of an analog adder is advantageous in reducing the number of times of A/D conversion, and shortening a horizontal processing period.

Further, the number of pixel arrays 100 for outputting pixel signals to be summed up by the adder 50 may be set variable. The modification enables to vary the sensitivity of a solid-state image pickup element.

(Arrangement Intervals Ps and Pd)

The following two patterns i.e. Case A and Case 2 are proposed regarding the assignment order of an output processing period.

Case A: This is a pattern, in which an output processing period is assigned in the order from a forward pixel array group 10 toward a rearward pixel array group 10 with respect to the moving direction of the pixel unit 1. In this case, an output processing period is assigned in the order of R, G, B, R, . . . in FIG. 1.

Case B: This is a pattern, in which an output processing period is assigned in the order from a rearward pixel array group 10 toward a forward pixel array group 10 with respect to the moving direction of the pixel unit 1. In this case, an output processing period is assigned in the order of B, G, R, B, . . . in FIG. 1.

In the case where Case A is employed, the arrangement interval Ps between the pixel array groups 10 is expressed by the formula (1); and in the case where Case B is employed, the arrangement interval Ps between the pixel array groups 10 is expressed by the formula (2).

$$Pd(\text{Case } A) = V*H*(M*(N+\alpha)+1) \tag{1}$$

$$Pd(\text{Case } B) = V*H*(M*(N+\alpha)+1)-1) \tag{2}$$

where α s an integer of zero or larger.

Further, the arrangement interval Ps between N pixel arrays 100 in one pixel array group 10 is expressed by the formula (3).

$$Ps = V*H*(M-\delta t)(\delta t < 1) \tag{3}$$

Therefore, obtaining Pd/Ps in each of Case A and Case B cancels VH, and formulas (4) and (5) are obtained. The symbol δt indicates a delay time normalized by the horizontal processing period H, and will be described later in detail.

$$\text{Case } A: Pd/Ps = (M*(N+\alpha)+1)/(M-\delta t) \tag{4}$$

$$\text{Case } B: Pd/Ps = (M*(N+\alpha+1)-1)/(M-\delta t) \tag{5}$$

Accordingly, in Case A, setting the arrangement intervals Pd and Ps to satisfy the relationship as expressed by the formula (4) enables to align the exposure start positions of each of the pixel arrays 100 with each other. FIG. 11 shows a case where M=3, N=2, α=0, and δt=½ are substituted in the formula (4), and the arrangement intervals Pd and Ps are set to satisfy a relationship: Pd=(7/2.5)*Ps.

Further, in Case B, setting the arrangement intervals Pd and Ps to satisfy the relationship as expressed by the formula (5) enables to align the exposure start positions of each of the pixel arrays 100 with each other. FIG. 12 shows a case where M=3, N=2, α=0, and δt=½ are substituted in the formula (5), and the arrangement intervals Pd and Ps are set to satisfy a relationship: Pd=(8/2.5)*Ps.

Further, FIG. 8 shows a case where M=3, N=2, α=0, and δt=0 are substituted in the formula (4), and the arrangement intervals Pd and Ps are set to satisfy a relationship: Pd=7Ps/3.

Next, the formulas (1) and (2) are explained. The symbol Lc indicates an adjustment distance for use in exposing each of the pixel array groups 10 at the same subject position. In Case A, the output processing period for the pixel array 100_*i*+1 is a period after lapse of 1H with respect to the output processing period for the pixel array 100_*i*. For instance, referring to FIG. 1, in the case where an output processing period is assigned in the order of R, G, and B, the output processing period for G pixels is a period after lapse of 1H with respect to the output processing period for R pixels. Accordingly, in Case A, Lc=V*H is set for exposing each of the pixel array groups at a certain frame.

Further, in Case B, the output processing period for the pixel array 100_$i$+1 is a period after lapse of (M−1)*H with respect to the output processing period for the pixel array 100_$i$. For instance, referring to FIG. 1, in the case where an output processing period is assigned in the order of B, G, and R, the output processing period for G pixels is a period after lapse of 2H with respect to the output processing period for R pixels. Accordingly, in Case B, Lc=V*(M−1)*H is set for exposing each of the pixel array groups at the same subject position.

The adjustment distance Lc satisfies a relationship: Ld=N*V*δt+Lc with respect to the length Ld of the interval region 13 in a vertical direction.

The distance Lf by which a pixel array group 10 is moved relative to a subject during one frame period T is expressed by: Lf=V*H*M. Therefore, the arrangement interval Pd between the pixel array groups 10 can be expressed by the following formula.

$$Pd=Lf\times N+Lc+\beta$$

where β is an additional space to be provided between pixel array groups different from each other, and should be a multiple number of the moving distance of a pixel array group 10 during one frame period T. In view of the above, β satisfies a relationship: β=V*H*M*α, where α is an integer of zero or larger.

Substituting LF=V*H*M, Lc=V*H (Case A), or V*(M−1)*H (case B), and β=V*H*M*α in the formula: Pd=Lf×N+Lc+β yields the formulas (1) and (2).

Next, the formula (3) is explained. It is necessary to align the exposure start position of the pixel array 100_N and the exposure start position of the pixel array 100_N−1 with each other for aligning the exposure start positions of N pixel arrays 100 constituting one pixel array group 10 with each other.

In the case where the moving distance during one frame period T and the arrangement interval Ps are equal to each other in the pixel arrays 100_1 through 100_N, setting the readout timings of pixel signals to be outputted from the pixel arrays 100_1 through 100_N to coincide with each other during a horizontal processing period H enables to align the exposure start positions of each of the pixel arrays 100 with each other.

In this embodiment, however, the output timings of pixel signals to be outputted from each of the pixel arrays 100 differ from each other during a horizontal processing period H. As a result, as shown in FIG. 7, the exposure start positions of each of the pixel arrays 100 may be slightly displaced from each other. In view of the above, in this embodiment, the arrangement interval Ps is set to such a value as to cancel such a slight displacement.

Specifically, the arrangement interval Ps is defined by the following formula.

$$Ps=V\text{*(exposure start timing of pixel array 100}\_N-\\ \text{exposure start timing of pixel array 100}\_N-1)=\\ V\text{*}(H\text{*}M-\delta T)$$

For instance, as shown in FIG. 3, in the case where M=3, the exposure start timing of the pixel array 100_N is t4, and the exposure start timing of the pixel array 100_N−1 is δT with respect to the timing t1 as a reference; and the time duration from the timing t1 to the timing t4 is 3H. Accordingly, Ps=V*(3H−δT).

In this example, setting δT=δt*H yields the formula (3). If δT>1H, a processing for the next pixel array group may be started. In view of the above, δT never delays over 1H. Therefore, δt<1.

Next, the delay frame number Dd representing deviation in the frame number during a readout period at the same subject position is explained. The delay frame number Dd is expressed by the formula (6) in Case A, and is expressed by the formula (7) in Case B.

$$Dd(\text{Case }A)=N+\alpha[\text{frame}] \quad (6)$$

$$Dd(\text{Case }B)=N+\alpha+1[\text{frame}] \quad (7)$$

Now, let us consider the delay frame number Dd' in the case where N=1 and α=0. In Case A, the assignment order of an output processing period is started from a forward pixel array group 10 with respect to the moving direction of the pixel unit 1. Accordingly, it is possible to obtain pixel signals at the same subject position after lapse of one frame period T. Thus, Dd' (Case A)=1 [frame].

On the other hand, in Case B, the assignment order of an output processing period is started from a rearward pixel array group 10 with respect to the moving direction of the pixel unit 1. Accordingly, it is possible to obtain pixel signals at the same subject position after lapse of two frame periods 2T. Thus, Dd' (Case B)=2 [frame].

Next, let us consider the delay frame number Dd in the case where N pixel arrays are provided and α≠0. In this case, there exist N pixel arrays 100, and an additional space to be defined by α is provided. Accordingly, the delay frame number Dd is expressed by the following formula.

$$Dd=Dd'+N-1+\alpha[\text{frame}]$$

Therefore, in Case A, Dd is expressed by the formula (6), and in Case B, Dd is expressed by the formula (7).

The aforementioned image pickup device may have the following configuration.

(1) The image memory 8 shown in FIG. 1 may be provided inside of the solid-state image pickup device or may be provided outside of the solid-state image pickup device. Further, the image memory 8 may preferably have at least a capacity of storing pixel data corresponding to plural pixel arrays to be outputted during a period corresponding to the delay frame number Dd×M so as to read out pixel signals at the same subject position.

(2) The readout section 20 is not limited to the one shown in FIG. 1. Alternatively, the readout section 20 may be configured of an element for outputting an analog pixel signal without A/D conversion. In the modification, it is not necessary to provide an A/D converter 60 in the readout section 20. Further, in the modification, an analog memory may be used in place of the latch section 70. Further alternatively, the amplifier 30 may be omitted from the readout section 20.

(3) The adder 50 sums up pixel signals. The invention is not limited to the above. Alternatively, a summation and averaging processing may be performed. Further alternatively, a weight coefficient may be set with respect to each of pixel signals for performing weighted summation. Further alternatively, these processings may be performed in a digital manner or in an analog manner.

(4) The third processing S3 may be executed before the second processing S2 is executed and after the first processing S1 is ended. In the modification, since the number of signal holding portions 41 increases, it is preferable to execute the third processing S3 after the second processing S2 is ended in the aspect of reducing the number of signal holding portions 41.

(5) In this embodiment, the pixel unit 1 is constituted of three pixel array groups 101.e. R, G, and B pixel array groups. Alternatively, the pixel unit 1 may be constituted of four pixel array groups i.e. R, G, B, and Ir (infrared) pixel array groups.

The pixel unit 1 is not limited to color pixel array groups. Alternatively, for instance, pixel array groups 10 different from each other may be constituted of e.g. two pixel array groups 10 having different sensitivities from each other, and each of the pixel array groups 10 may be constituted of monochromatic N pixel arrays.

(6) In FIG. 1, a pixel array 100 is configured in such a manner that pixels GE are linearly arranged in a horizontal direction. Alternatively, for instance, the pixels GE may be arranged in a zigzag manner in a horizontal direction. With the above modification, it is possible to configure a pixel array 100 having a pseudo honeycomb structure.

(7) The pixel circuit GC is constituted of a four-transistor type pixel circuit having a transfer transistor TQ. Alternatively, for instance, the pixel circuit GC may be constituted of a three-transistor type pixel circuit without a transfer transistor TQ.

(8) The output control section 5 may perform TDI for pixel arrays of a variable number. In the case where the number of pixel arrays for TDI is set to "k", the output control section 5 may use "k" pixel arrays 100 in each of the pixel array groups in the order from the pixel array 100_N toward a forward pixel array.

The following is a summary of the technical features of the aforementioned solid-state image pickup device and the like.

(1) The solid-state image pickup device is a solid-state image pickup device including a pixel unit which is movable relative to a subject in a vertical direction at a predetermined moving speed, the pixel unit including M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction; readout sections which are provided in correspondence to columns of the pixel unit arranged in the horizontal direction, each of the readout sections being provided in common for each of the columns to read out pixel signals outputted from each pixel array; and an output control section which selects each one of the pixel array groups in a predetermined order, selects each one of the pixel arrays in the selected pixel array group in a predetermined order, causes the readout sections to read out, as pixel signals of a current frame, pixel signals of one frame obtained by exposing the last pixel array in the selected pixel array group, and causes the readout sections to read out, as pixel signals of a previous frame, pixel signals of one frame obtained by exposing the pixel arrays in the forward of the last pixel array with respect to the moving direction of the pixel unit in the selected pixel array group. Each of the readout sections includes: a signal holding portion which holds a pixel signal of the previous frame; and an adder which sums up the pixel signal of the current frame, and the pixel signal of the previous frame which is in the same pixel array group and is for the same subject position as the current frame among the respective pixel signals of the previous frames held in the signal holding portion.

Further, a driving method for the solid-state image pickup device is a driving method for a solid-state image pickup device provided with a pixel unit which is movable relative to a subject in a vertical direction at a predetermined moving speed, the pixel unit including M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction, readout sections which are provided in correspondence to columns of the pixel unit arranged in the horizontal direction, each of the readout sections being provided in common for each of the columns to read out pixel signals from each pixel array, and an output control section which selects each one of the pixel array groups in a predetermined order, selects each one of the pixel arrays in the selected pixel array group in a predetermined order, causes the readout sections to read out, as pixel signals of a current frame, pixel signals to be outputted from the last pixel array in the selected pixel array group, and causes the readout sections to read out, as pixel signals of a previous frame, pixel signals in the pixel arrays in the forward of the last pixel array with respect to the moving direction of the pixel unit in the selected pixel array group, each of the readout sections including a signal holding portion and an adder. The method includes a step of holding a pixel signal of the previous frame in the signal holding portion; and a step of summing up, by the adder, the pixel signal of the current frame, and the pixel signal of the previous frame which is in the same pixel array group and is for the same subject position as the current frame among the respective pixel signals of the previous frames held in the signal holding portion.

With the above configurations, the pixel unit is provided with M pixel array groups. Each of the pixel array groups is constituted of N pixel arrays. In this way, the pixel unit is configured in such a manner that pixels are arranged in a matrix. The pixel unit is movable relative to the subject in the vertical direction at the predetermined moving speed. The readout sections are provided in correspondence to the columns of the pixel unit, which is composed of the matrix-arranged pixels, in the horizontal direction. In other words, assuming that the pixel unit is composed of L columns arranged in the horizontal direction, L readout sections are provided.

The output control section selects each one of the pixel array groups in the predetermined order, and causes the readout sections to read out, as pixel signals of a current frame, pixel signals of one frame obtained by exposing the last pixel array in the selected pixel array group. The readout pixel signal of the current frame is summed up with the pixel signal of the previous frame which is in the same pixel array group and is for the same subject position as the previous frame.

With the above configuration, the solid-state image pickup device which is configured not to require transfer of signal charges between pixels can perform TDI.

Here, the same pixel array group means the same pixel array group as the pixel array group constituting the last pixel array that has outputted pixel signals of the current frame. Further, the same subject position means identical positions in the subject. However, the positions may not necessarily and completely identical to each other, but may be displaced from each other to some extent.

Further, the last pixel array may be changed as necessary in accordance with the number of pixel arrays for which TDI is performed, such as the N-th pixel array, or one of the second pixel array through the (N−1)-th pixel array among N pixel arrays.

(2) Preferably, the N pixel arrays may be sequentially arranged in the vertical direction. With the above configuration, N pixel arrays constituting one pixel array group are arranged in a group in the vertical direction. This enables to simplify the pixel signal readout processing in performing TDI.

(3) Preferably, each of the readout sections may include M signal holding portion groups in correspondence to the M pixel array groups, each of the signal holding portion groups may include at least (N−1) signal holding portions, and the output control section may cause the signal holding portion in the corresponding signal holding portion group to hold the pixel signal of the previous frame.

With the above configuration, M signal holding portion groups are provided in correspondence to M pixel array groups, respectively. Accordingly, the adder can easily specify a signal holding portion which holds the pixel signal of the previous frame corresponding to the pixel signal of the current frame. Further, since each of the signal holding portion groups is provided with at least (N−1) signal holding portions, it is possible to perform TDI for N pixel arrays.

(4) Preferably, the adder may perform a summation processing, or a summation and averaging processing.

In the case where the adder performs the summation and averaging processing, it is possible to further enhance the S/N ratio by TDI. In the case where the adder performs the summation processing, it is possible to simplify the circuit configuration of the adder.

(5) Preferably, each of the readout portions may include an amplifier which amplifies a pixel signal outputted from the pixel unit, and outputs the amplified pixel signal to the signal holding portion; and a feedback loop which feeds back the pixel signal held in the signal holding portion to the amplifier, wherein the output control section supplies to the amplifier a pixel signal which in the same pixel array group and is for the same subject position as the current frame via the feedback loop, and causes the amplifier to sum up the pixel signal of the current frame outputted from the pixel unit and the pixel signal supplied via the feedback loop, whereby the amplifier functions as the adder.

With the above configuration, providing the amplifier with the function of the adder is advantageous in eliminating the need of providing an adder in addition to an amplifier. This is advantageous in reducing the circuit scale of the readout section.

(6) Preferably, the output control section may be operable to set the number of the pixel arrays to be selected variable in each of the pixel array groups.

With the above configuration, since the number of the pixel arrays to be selected is set variable in each of the pixel array groups, it is possible to change the number of pixel arrays for TDI, as necessary. This is advantageous in setting the sensitivity variable. Thus, a proper sensitivity can be set depending on an image pickup condition e.g. by setting the number of pixel arrays for TDI small in the case where the subject is exposed in a bright condition, and by setting the number of pixel arrays for TDI large in the case where the subject is exposed in a dark condition.

(7) Preferably, the output control section may sequentially select each one of the pixel array groups in the order from a forward pixel array group toward a rearward pixel array group with respect to the moving direction of the pixel unit, and the pixel unit may satisfy the following relationship:

$Pd/Ps=(M*(N+\alpha)+1)/M$ where

Pd is an arrangement interval between M pixel array groups in the vertical direction, Ps is an arrangement interval between pixel arrays constituting each of the pixel array groups in the vertical direction, and α is an integer of zero or larger.

With the above configuration, in the case where the order of selecting each pixel array group is the order from the forwarding pixel array group toward the rearward pixel array group with respect to the moving direction of the pixel unit, it is possible to expose the pixel array groups different from each other at the same subject position.

(8) Preferably, the output control section may sequentially select each one of the pixel array groups in the order from a rearward pixel array group toward a forward pixel array group with respect to the moving direction of the pixel unit, and the pixel unit may satisfy the following relationship:

$Pd/Ps=(M*(N+\alpha+1)-1)/M$ where

Pd is an arrangement interval between M pixel array groups in the vertical direction, Ps is an arrangement interval between pixel arrays constituting each of the pixel array groups in the vertical direction, and α is an integer of zero or larger.

With the above configuration, in the case where the order of selecting each pixel array group is the order from the rearward pixel array group toward the forward pixel array group with respect to the moving direction of the pixel unit, it is possible to expose the pixel array groups different from each other at the same subject position.

(9) Preferably, the output control section may sequentially select each one of the pixel array groups in the order from a forward pixel array group toward a rearward pixel array group with respect to the moving direction of the pixel unit, and after selecting the last pixel array, sequentially selects each one of the pixel arrays other than the last pixel array at an interval of a predetermined delay time, and the pixel unit may satisfy the following relationship:

$Pd/Ps=(M*(N+\alpha)+1)/(M-\delta t)$ where

Pd is an arrangement interval between M pixel array groups in the vertical direction, Ps is an arrangement interval between N pixel arrays constituting each of the pixel array groups in the vertical direction, α is an integer of zero or larger, and δt is the delay time.

With the above configuration, in the case where the order of selecting each pixel array group is the order from the forward pixel array group toward the rearward pixel array group with respect to the moving direction of the pixel unit, it is possible to expose the pixel arrays constituting one pixel array group at the same subject position.

(10) Preferably, the output control section may sequentially select each one the pixel array groups in the order from a rearward pixel array group toward a forward pixel array group with respect to the moving direction of the pixel unit, and after selecting the last pixel array, sequentially selects each one of the pixel arrays other than the last pixel array at an interval of a predetermined delay time, and the pixel unit may satisfy the following relationship:

$Pd/Ps=(M*(N+\alpha+1)-1)/(M-\delta t)$ where

Pd is an arrangement interval between M pixel array groups in the vertical direction, Ps is an arrangement interval between N pixel arrays constituting each of the pixel array groups in the vertical direction, α is an integer of zero or larger, and δt is the delay time.

With the above configuration, in the case where the order of selecting each pixel array group is the order from the rearward pixel array group toward the forward pixel array group with respect to the moving direction of the pixel unit, it is possible to expose the pixel arrays constituting one pixel array group at the same subject position.

(11) Preferably, each of the pixels may be constituted of a photoelectric conversion section and a pixel circuit, the pixel circuit may include a floating diffusion which converts a signal charge accumulated in the photoelectric conversion section into a voltage signal, a transfer transistor which transfers the signal charge accumulated in the photoelectric conversion section to the floating diffusion, and a reset transistor which resets the floating diffusion, and at least a part of circuit elements of the pixel circuit may be disposed between different pixel array groups among the pixel array groups.

With the above configuration, it is possible to increase the area ratio of the photoelectric conversion section in the pixel array, as compared with an arrangement, in which all the circuit elements of a pixel circuit are disposed in a light receiving region of a pixel array. This is advantageous in enhancing the sensitivity.

(12) Preferably, at least parts of the circuit elements of the pixel circuits in a pair of pixels which are symmetrical arranged in two pixel arrays which are disposed as opposed to each other with respect to a boundary between the different pixel array groups, may be specularly arranged with respect to the boundary.

With the above configuration, in the case where each of the pixel array groups is constituted of two pixel arrays, where N=2, for instance, it is possible to increase the area ratio of the photoelectric conversion section in each of the pixels. This is advantageous in enhancing the sensitivity. Further, since the parts of the circuit elements are specularly arranged, the above arrangement is advantageous in miniaturization.

(13) Preferably, the pair of pixels may be configured in such a manner that at least the parts of the circuit elements of the pixel circuits are shared with each other, and the shared parts of the circuit elements may be disposed in the boundary.

With the above configuration, since the shared circuit elements are disposed in the boundary, it is possible to increase the area ratio of the photoelectric conversion section in the pixel array. This is advantageous in enhancing the sensitivity, and is also advantageous in miniaturization.

(14) Preferably, the output control section may select each one of the pixel array groups by sequentially assigning an output processing period to each pixel array group at an interval of one horizontal processing period, the one horizontal processing period being obtained by dividing one frame period into M, the one frame period being a period when the pixel array is moved in the vertical direction by a predetermined distance. In the case where the output processing period is assigned to a certain pixel array group as a target pixel array group, the output control section may execute a first processing of causing the last pixel array in the target pixel array group to output a pixel signal of the current frame. In the case where the output processing period is assigned to the target pixel array group in the past, the output control section may execute a second processing of causing the adder to sum up the pixel signal of the current frame, and the pixel signal of the previous frame which is held in the signal holding portion and is for the same subject position as the current frame. The output control section may execute a third processing of causing the pixel arrays other than the last pixel array in the target pixel array group to sequentially output a pixel signal of the previous frame, and causing the signal holding portion to hold the pixel signal of the previous frame.

With the above configuration, each one of the pixel array groups is selected at an interval of the one horizontal processing period obtained by dividing the one frame period into M. The one frame period is a period when one pixel array is moved by the predetermined distance. Assuming that M=3, for instance, the one horizontal processing period is one-third of the one frame period.

In the case where a certain pixel array group is selected as a target pixel array group, the pixel signal of the current frame is read out from the last pixel array to the readout section, and is inputted to the adder in the readout section (first processing). The pixel signal of the current frame inputted to the adder is summed up with the pixel signal of the previous frame which is held in the signal holding portion and is for the same subject position as the current frame in the case where the target pixel array group is selected in the past (second processing).

When the second processing is ended, the pixel signals of the previous frame are sequentially outputted from the pixel arrays other than the last pixel array, and held in the signal holding portion (third processing).

Here, let us assume that N pixel arrays constituting the target pixel array group are the first pixel array through the N-th pixel array, and the last pixel array is the N-th pixel array. A pixel signal Vt_N which is outputted from the N-th pixel array as the last pixel array at this time (t) is a pixel signal obtained at the same subject position as pixel signals Vt−1_(N−1), Vt−2_(N−2), Vt−3_(N−3), . . . , which are outputted from the (N−1)-th pixel array, the (N−2)-th pixel array, and the (N−3)-th pixel array in the case where the target pixel array group is selected at a last time (t), a last time (t−1), a time (t−2) before the last time, . . . .

Accordingly, in the second processing, it is possible to perform TDI by reading out, from the signal holding portion, the pixel signal Vt−1_(N−1), Vt−2_(N−2), Vt−3_(N−3), . . . , and by causing the adder to sum up the corresponding readout pixel signal and the inputted pixel signal Vt_N.

Further, since the other pixel array groups are processed in the same manner as described above, as the target pixel array group, it is possible to perform TDI for all the pixel array groups. Accordingly, with the above configuration, unlike a CMOS solid-state image pickup device in which transfer of pixel signals between pixels is performed, it is possible to perform TDI for each pixel array group, even in a solid-state image pickup device provided with readout sections common for the pixel arrays.

(15) An image pickup apparatus according to another aspect of the invention is provided with the solid-state image pickup device having one of the aforementioned configurations, and a control section which controls the solid-state image pickup device.

With the above configuration, it is possible to implement an image pickup apparatus provided with the solid-state image pickup device having one of the aforementioned configurations.

(16) Preferably, the image pickup apparatus may further include a horizontal scanning circuit which sequentially outputs a pixel signal outputted from each of the readout sections in the order from a forward readout section toward a rearward readout section with respect to the horizontal direction; and an image memory which stores the pixel signals sequentially outputted from the readout sections by the amount corresponding to plural frames, wherein the image memory is included in the solid-state image pickup device or in the control section.

With the above configuration, since the image pickup apparatus is provided with the image memory capable of storing pixel signals corresponding to plural frames, it is possible to implement image processing with use of the pixel signals obtained at the same subject position in all the pixel array groups by storing, in the image memory, the pixel signals in all the pixel array groups obtained at the same subject position, which are outputted at different timings because the pixel array groups are pixel array groups different from each other.

The invention claimed is:

1. A solid-state image pickup device comprising:
a pixel unit which is movable relative to a subject at a predetermined moving speed in a vertical direction, the pixel unit including M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction;
readout sections which are provided in correspondence to columns of the pixel unit arranged in the horizontal direction, each of the readout sections being provided in common for each of the columns to read out pixel signals outputted from each pixel array; and
an output control section which selects each one of the pixel array groups in a predetermined order, selects each one of the pixel arrays in the selected pixel array group in a predetermined order, causes the readout sections to read out, as pixel signals of a current frame, pixel signals of one frame obtained by exposing the last pixel array in the selected pixel array group, and causes the readout sections to read out, as pixel signals of a previous frame, pixel signals of one frame obtained by exposing the pixel arrays in the forward of the last pixel array with respect to the moving direction of the pixel unit in the selected pixel array group,
each of the readout sections including:
a signal holding portion which holds a pixel signal of the previous frame; and
an adder which sums up the pixel signal of the current frame, and the pixel signal of the previous frame which is in the same pixel array group and is for the same subject position as the current frame among the respective pixel signals of the previous frames held in the signal holding portion.

2. The solid-state image pickup device according to claim 1, wherein
the N pixel arrays are sequentially arranged in the vertical direction.

3. The solid-state image pickup device according to claim 1, wherein
each of the readout sections includes M signal holding portion groups in correspondence to the M pixel array groups,
each of the signal holding portion groups includes at least (N−1) signal holding portions, and
the output control section causes the signal holding portion in the corresponding signal holding portion group to hold the pixel signal of the previous frame.

4. The solid-state image pickup device according to claim 1, wherein
the adder performs a summation processing, or a summation and averaging processing.

5. The solid-state image pickup device according to claim 1, wherein
each of the readout portions includes:
an amplifier which amplifies a pixel signal outputted from the pixel unit, and outputs the amplified pixel signal to the signal holding portion; and
a feedback loop which feeds back the pixel signal held in the signal holding portion to the amplifier, wherein
the output control section supplies to the amplifier a pixel signal which is in the same pixel array group and is for the same subject position as the current frame via the feedback loop, and causes the amplifier to sum up the pixel signal of the current frame outputted from the pixel unit and the pixel signal supplied via the feedback loop, whereby the amplifier functions as the adder.

6. The solid-state image pickup device according to claim 1, wherein
the output control section is operable to set the number of the pixel arrays to be selected variable in each of the pixel array groups.

7. The solid-state image pickup device according to claim 1, wherein
the output control section sequentially selects each one of the pixel array groups in the order from a forward pixel array group toward a rearward pixel array group with respect to the moving direction of the pixel unit, and
the pixel unit satisfies the following relationship:

$$Pd/Ps=(M*(N+\alpha)+1)/M$$

where
Pd is an arrangement interval between M pixel array groups in the vertical direction,
Ps is an arrangement interval between pixel arrays constituting each of the pixel array groups in the vertical direction, and
$\alpha$ is an integer of zero or larger.

8. The solid-state image pickup device according to claim 1, wherein
the output control section sequentially selects each one of the pixel array groups in the order from a rearward pixel array group toward a forward pixel array group with respect to the moving direction of the pixel unit, and
the pixel unit satisfies the following relationship:

$$Pd/Ps=(M*(N+\alpha+1)-1)/M$$

where
Pd is an arrangement interval between M pixel array groups in the vertical direction,
Ps is an arrangement interval between pixel arrays constituting each of the pixel array groups in the vertical direction, and
$\alpha$ is an integer of zero or larger.

9. The solid-state image pickup device according to claim 1, wherein
the output control section sequentially selects each one of the pixel array groups in the order from a forward pixel array group toward a rearward pixel array group with respect to the moving direction of the pixel unit, and after selecting the last pixel array, sequentially selects each one of the pixel arrays other than the last pixel array at an interval of a predetermined delay time, and
the pixel unit satisfies the following relationship:

$$Pd/Ps=(M*(N+\alpha)+1)/(M-\delta t)$$

where
Pd is an arrangement interval between M pixel array groups in the vertical direction,
Ps is an arrangement interval between N pixel arrays constituting each of the pixel array groups in the vertical direction,
$\alpha$ is an integer of zero or larger, and
$\delta t$ is the delay time.

10. The solid-state image pickup device according to claim 1, wherein the output control section sequentially selects each one the pixel array groups in the order from a rearward pixel array group toward a forward pixel array group with respect to the moving direction of the pixel unit, and after selecting the last pixel array, sequentially selects each one of the pixel arrays other than the last pixel array at an interval of a predetermined delay time, and the pixel unit satisfies the following relationship:

$$Pd/Ps=(M*(N+\alpha+1)-1)/(M-\delta t)$$

where

Pd is an arrangement interval between M pixel array groups in the vertical direction, Ps is an arrangement interval between N pixel arrays constituting each of the pixel array groups in the vertical direction, $\alpha$ is an integer of zero or larger, and $\delta t$ is the delay time.

11. The solid-state image pickup device according to claim 1, wherein each of the pixels is constituted of a photoelectric conversion section and a pixel circuit, the pixel circuit includes a floating diffusion which converts a signal charge accumulated in the photoelectric conversion section into a voltage signal, a transfer transistor which transfers the signal charge accumulated in the photoelectric conversion section to the floating diffusion, and a reset transistor which resets the floating diffusion, and at least a part of circuit elements of the pixel circuit is disposed between different pixel array groups among the pixel array groups.

12. The solid-state image pickup device according to claim 11, wherein at least parts of the circuit elements of the pixel circuits in a pair of pixels which are symmetrical arranged in two pixel arrays which are disposed as opposed to each other with respect to a boundary between the different pixel array groups, are specularly arranged with respect to the boundary.

13. The solid-state image pickup device according to claim 12, wherein the pair of pixels are configured in such a manner that at least the parts of the circuit elements of the pixel circuits are shared with each other, and the shared parts of the circuit elements are disposed in the boundary.

14. The solid-state image pickup device according to claim 1, wherein the output control section selects each one of the pixel array groups by sequentially assigning an output processing period to each pixel array group at an interval of one horizontal processing period, the one horizontal processing period being obtained by dividing one frame period into M, the one frame period being a period when the pixel array is moved in the vertical direction by a predetermined distance, in the case where the output processing period is assigned to a certain pixel array group as a target pixel array group, the output control section executes a first processing of causing the last pixel array in the target pixel array group to output a pixel signal of the current frame, in the case where the output processing period is assigned to the target pixel array group in the past, the output control section executes a second processing of causing the adder to sum up the pixel signal of the current frame, and the pixel signal of the previous frame which is held in the signal holding portion and is for the same subject position as the current frame, and the output control section executes a third processing of causing the pixel arrays other than the last pixel array in the target pixel array group to sequentially output a pixel signal of the previous frame, and causing the signal holding portion to hold the pixel signal of the previous frame.

15. An image pickup apparatus comprising:

the solid-state image pickup device of claim 1, and a control section which controls the solid-state image pickup device.

16. The image pickup apparatus according to claim 15, further comprising:

a horizontal scanning circuit which sequentially outputs a pixel signal outputted from each of the readout sections in the order from a forward readout section toward a rearward readout section with respect to the horizontal direction; and an image memory which stores the pixel signals sequentially outputted from the readout sections by the amount corresponding to plural frames, wherein the image memory is included in the solid-state image pickup device or in the control section.

17. A driving method for a solid-state image pickup device provided with a pixel unit which is movable relative to a subject at a predetermined moving speed in a vertical direction, the pixel unit including M (where M is an integer of one or larger) pixel array group(s) arranged in the vertical direction, each pixel array group being constituted of N (where N is an integer of two or larger) pixel arrays, and each of the pixel arrays being constituted of pixels aligned in a horizontal direction orthogonal to the vertical direction, readout sections which are provided in correspondence to columns of the pixel unit arranged in the horizontal direction, each of the readout sections being provided in common for each of the columns to read out pixel signals from each pixel array, and an output control section which selects each one of the pixel array groups in a predetermined order, selects each one of the pixel arrays in the selected pixel array group in a predetermined order, causes the readout sections to read out, as pixel signals of a current frame, pixel signals to be outputted from the last pixel array in the selected pixel array group, and causes the readout sections to read out, as pixel signals of a previous frame, pixel signals in the pixel arrays in the forward of the last pixel array with respect to the moving direction of the pixel unit in the selected pixel array group, each of the readout sections including a signal holding portion and an adder, the method comprising:

a step of holding a pixel signal of the previous frame in the signal holding portion; and a step of summing up, by the adder, the pixel signal of the current frame, and the pixel signal of the previous frame which is in the same pixel array group and is for the same subject position as the current frame among the respective pixel signals of the previous frames held in the signal holding portion.

* * * * *